ID:US009115661B2

(12) United States Patent
Iwazaki et al.

(10) Patent No.: US 9,115,661 B2
(45) Date of Patent: Aug. 25, 2015

(54) FUEL INJECTION AMOUNT CONTROL SYSTEM AND FUEL INJECTION AMOUNT CONTROL DEVICE FOR MULTI-CYLINDER INTERNAL COMBUSTION ENGINE

(75) Inventors: Yasushi Iwazaki, Ebina (JP); Hiroshi Miyamoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1001 days.

(21) Appl. No.: 13/194,922

(22) Filed: Jul. 30, 2011

(65) Prior Publication Data

US 2012/0029792 A1 Feb. 2, 2012

(30) Foreign Application Priority Data

Jul. 30, 2010 (JP) ................................ 2010-171585

(51) Int. Cl.
*G06F 7/00* (2006.01)
*G06F 17/00* (2006.01)
(Continued)

(52) U.S. Cl.
CPC ........ *F02D 41/1441* (2013.01); *F02D 41/2493* (2013.01); *F02D 2041/1432* (2013.01); *Y02T 10/22* (2013.01)

(58) Field of Classification Search
CPC ............ F02D 41/0085; F02D 41/1456; F02D 41/1454; F02D 41/008; F02D 41/0052; G01M 15/104; G01M 15/102; B60Y 2300/431
USPC .......... 701/104, 130, 109; 123/673, 672, 691, 123/692, 703, 704; 60/274, 279, 299; 73/23.31, 114.69–114.73
See application file for complete search history.

(56) References Cited

U.S. PATENT DOCUMENTS 6,314,952 B1 * 11/2001 Turin et al. .................... 123/673
6,382,198 B1 * 5/2002 Smith et al. ................... 123/673
(Continued)

FOREIGN PATENT DOCUMENTS

JP 11072473 A 3/1999
JP 2000065782 A 3/2000
(Continued)

OTHER PUBLICATIONS

U.S. Appl. No. 13/194,929, filed Jul. 30, 2011 (please disregard U.S. Appl. No. 13/197,358, filed Jul. 30, 2011, previously cited in the Information Disclosure Statement dated Sep. 1, 2011—it was cited in error).
(Continued)

*Primary Examiner* — Mahmoud Gimie
*Assistant Examiner* — David Hamaoui
(74) *Attorney, Agent, or Firm* — Gifford, Krass, Sprinkle, Anderson & Citkowski, P.C.

(57) ABSTRACT

A fuel injection amount control system corrects the amount of fuel injected from each fuel injection valve in a feedback manner, based on an output value of an upstream air-fuel ratio sensor, so that the air-fuel ratio of exhaust gas flowing into a three-way catalyst coincides with a target air-fuel ratio. Also, the control system performs a high-pass filtering operation on the output value of the upstream air-fuel ratio sensor, so as to obtain a post-high-pass-filtering output value by removing a component that varies with variations in the center air-fuel ratio of the engine, from the output value of the upstream air-fuel ratio sensor. Then, the control system acquires an air-fuel ratio imbalance index value that increases as the degree of ununiformity in the air-fuel ratio among cylinders is larger, based on the post-high-pass-filtering output value.

1 Claim, 15 Drawing Sheets

(51) Int. Cl.
*F02D 41/30* (2006.01)
*F02D 41/14* (2006.01)
*F02D 41/24* (2006.01)

(56) References Cited

U.S. PATENT DOCUMENTS

| | | | |
|---|---|---|---|
| 6,668,812 B2 * | 12/2003 | Javaherian | 123/673 |
| 7,152,594 B2 * | 12/2006 | Anilovich et al. | 123/690 |
| 7,900,615 B2 * | 3/2011 | Wang et al. | 123/672 |
| 8,560,208 B2 * | 10/2013 | Miyamoto et al. | 701/103 |
| 8,577,645 B2 * | 11/2013 | Turin et al. | 702/183 |
| 8,583,348 B2 * | 11/2013 | Iwazaki et al. | 701/103 |
| 8,589,055 B2 * | 11/2013 | Hakariya et al. | 701/112 |
| 8,694,226 B2 * | 4/2014 | Kurahashi et al. | 701/103 |
| 2001/0025634 A1 * | 10/2001 | Poggio et al. | 123/673 |
| 2006/0260593 A1 | 11/2006 | Anilovich et al. | |
| 2008/0072884 A1 | 3/2008 | Okazaki | |
| 2012/0022772 A1 * | 1/2012 | Miyamoto et al. | 701/104 |
| 2012/0024273 A1 * | 2/2012 | Iwazaki et al. | 123/703 |
| 2012/0035831 A1 | 2/2012 | Kidokoro et al. | |
| 2013/0073184 A1 * | 3/2013 | Miyamoto et al. | 701/104 |
| 2013/0144510 A1 * | 6/2013 | Iwazaki et al. | 701/104 |

FOREIGN PATENT DOCUMENTS

| | | |
|---|---|---|
| JP | 2004069547 A | 3/2004 |
| JP | 2005-273524 A | 10/2005 |
| JP | 2005-337194 A | 12/2005 |
| JP | 2009-030455 A | 2/2009 |
| WO | 2010064331 A1 | 6/2010 |

OTHER PUBLICATIONS

U.S. Appl. No. 13/194,923, filed Jul. 30, 2011.
U.S. Appl. No. 13/197,358, filed Jul. 30, 2011.

* cited by examiner

DOWNSTREAM-SIDE AIR-FUEL RATIO afdown

ACTUAL IMBALANCE PROPORTION (%)
(DEGREE OF UNUNIFORMITY IN
AIR-FUEL RATIO AMONG CYLINDERS)

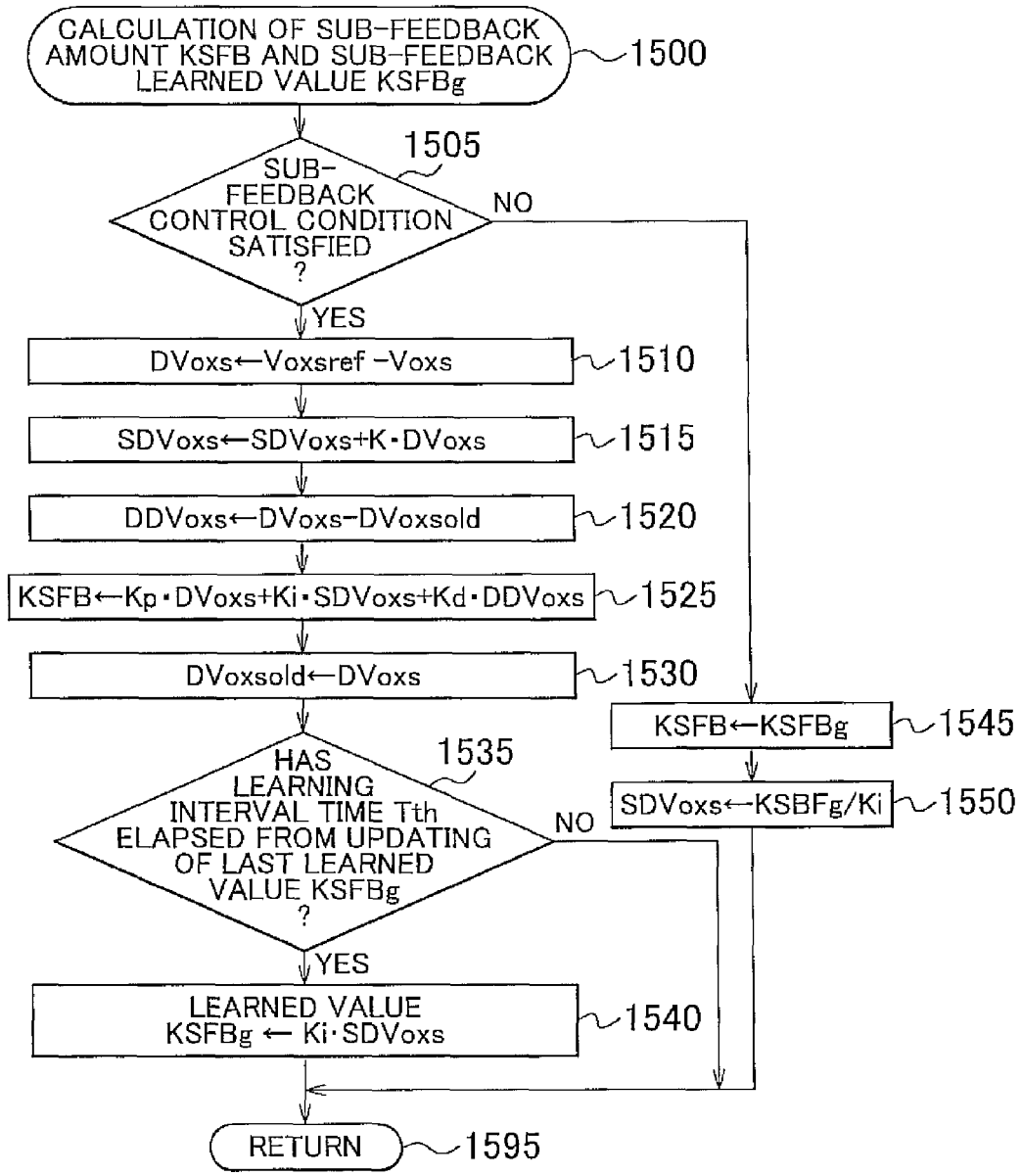

F I G . 16B
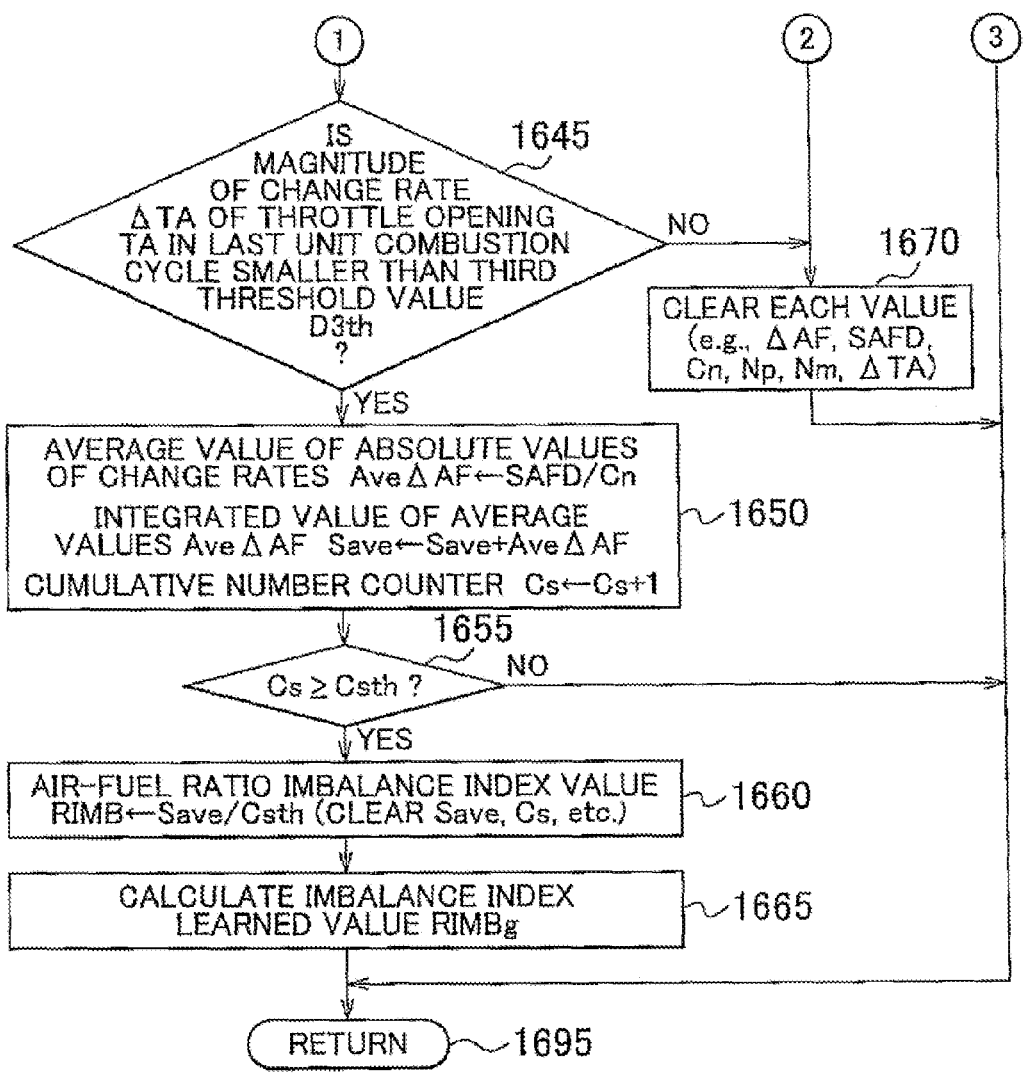

FUEL INJECTION AMOUNT CONTROL SYSTEM AND FUEL INJECTION AMOUNT CONTROL DEVICE FOR MULTI-CYLINDER INTERNAL COMBUSTION ENGINE

CROSS-REFERENCE TO RELATED APPLICATIONS

This application claims priority to Japanese Patent Application No. 2010-171585 filed on Jul. 30, 2010, which is incorporated herein by reference in its entirety including the specification, drawings and abstract.

BACKGROUND OF THE INVENTION

1. Field of the Invention

The invention relates to a fuel injection amount control system and a fuel injection amount control device for a multi-cylinder internal combustion engine.

2. Description of Related Art

Generally, an air-fuel ratio control system including a three-way catalyst disposed in an exhaust passage of a multi-cylinder internal combustion engine and an upstream air-fuel ratio sensor located upstream of the three-way catalyst has been widely known.

The air-fuel ratio control system is configured to calculate an air-fuel ratio feedback amount (main feedback amount) based on an output value of the upstream air-fuel ratio sensor, so that the air-fuel ratio of an air-fuel mixture supplied to the internal combustion engine (the air-fuel ratio of the engine, accordingly, the air-fuel ratio of exhaust gas) coincides with a target air-fuel ratio, and performs feedback control on the air-fuel ratio of the engine, using the main feedback amount. The feedback amount is a controlled variable common to all of the cylinders. The target air-fuel ratio is set to a given reference air-fuel ratio within the window of the three-way catalyst. Generally, the reference air-fuel ratio is the stoichiometric air-fuel ratio. The reference air-fuel ratio may be changed to a value in the vicinity of the stoichiometric air-fuel ratio, according to the intake air amount of the engine, the degree of degradation of the three-way catalyst, and so forth.

Generally, the air-fuel ratio control system as described above is applied to an internal combustion engine that employs an electronically controlled fuel injection system. The internal combustion engine has at least one fuel injection valve for each cylinder or an intake port that communicates with each cylinder. With this arrangement, if a fuel injection valve of a particular cylinder turns to "a characteristic that it injects fuel in an amount excessively larger than a designated fuel injection amount", only the air-fuel ratio of the air-fuel mixture supplied to the particular cylinder (the air-fuel ratio of the particular cylinder) changes largely into a richer (smaller) value. Namely, the degree of ununiformity in the air-fuel ratio among cylinders (variations in the air-fuel ratio among cylinders, cylinder-to-cylinder air-fuel ratio imbalance proportion) becomes larger. In other words, significant imbalances appear among "the air-fuel ratios of the individual cylinders" as the air-fuel ratios of air-fuel mixtures supplied to the respective cylinders. Then, the degree of ununiformity in the air-fuel ratio among cylinders becomes larger.

In the following description, the cylinder corresponding to "the fuel injection valve having a characteristic of injecting fuel in an amount excessively larger or excessively smaller than the designated fuel injection amount" will be called "imbalance cylinder", and the remaining cylinders (cylinders corresponding to "fuel injection valves that inject fuel in the designated fuel injection amount") will be called "non-imbalance cylinders (or normal cylinders)".

If the fuel injection valve of a certain particular cylinder turns to "a characteristic that it injects fuel in an amount excessively larger than the designated fuel injection amount", the average of the air-fuel ratios of air-fuel mixtures supplied to the engine as a whole becomes a richer air-fuel ratio than the target air-fuel ratio set to the reference air-fuel ratio. Accordingly, with the feedback amount of the air-fuel ratio common to all the cylinders, the air-fuel ratio of the particular cylinder is changed to a leaner (or larger) value so as to be closer to the reference air-fuel ratio, and at the same time, the air-fuel ratio of the other cylinders is changed to a leaner (or larger) value, deviate further from the reference air-fuel ratio. As a result, the average of the air-fuel ratios of the mixtures supplied to the engine as a whole (the average air-fuel ratio of exhaust gas) becomes equal to an air-fuel ratio in the vicinity of the reference air-fuel ratio.

However, the air-fuel ratio of the above-indicated particular cylinder is still a richer air-fuel ratio than the reference air-fuel ratio, and the air-fuel ratio of the remaining cylinders becomes a leaner air-fuel ratio than the reference air-fuel ratio. As a result, the amount of emissions discharged from each cylinder (the amount of unburned substances and/or the amount of nitrogen oxides) is increased, as compared with the case where the air-fuel ratio of each cylinder is equal to the reference air-fuel ratio. Therefore, even when the average of the air-fuel ratios of the mixtures supplied to the engine is equal to the reference air-fuel ratio, the increased emissions cannot be completely cleaned by the three-way catalyst, which may result in deterioration of the emissions.

In order to prevent emissions from being deteriorated, therefore, it is important to detect excessively large ununiformity in the air-fuel ratio among the individual cylinders (namely, the occurrence of air-fuel ratio imbalances among the cylinders), and take some measure against the imbalance condition. The air-fuel ratio imbalances among cylinders also occur, for example, when the fuel injection valve of a particular cylinder turns to "a characteristic that it injects fuel in an amount that is excessively smaller than the designated fuel injection amount".

One example of fuel injection amount control system according to the related art obtains a trace length of an output value (output signal) of an electromotive force type oxygen concentration sensor located upstream of a three-way catalyst. The control system compares the trace length with "a reference value that varies according to the engine speed", and determines whether an air-fuel ratio imbalance condition among cylinders has occurred based on the result of comparison (see, for example, U.S. Pat. No. 7,152,594).

In the meantime, the exhaust gases emitted from the respective cylinders reach the upstream air-fuel ratio sensor in the order in which the ignition takes place in the cylinder (which is the same as the order in which exhaust gas is discharged from the cylinder). If there is no difference in the air-fuel ratio among the cylinders (i.e., if no imbalance in the air-fuel ratio among the cylinders occurs), the air-fuel ratio of exhaust gas emitted from each cylinder and reaching the upstream air-fuel ratio sensor is substantially equal. Accordingly, when there is no difference in the air-fuel ratio among the cylinders, the output value Vabyfs of the upstream air-fuel ratio sensor varies as indicated by the broken line C1 in FIG. 3B, for example. Namely, if there is no imbalance or ununiformity in the air-fuel ratio among the cylinders, the output value Vabyfs of the upstream air-fuel ratio sensor assumes a generally flat waveform pattern. Therefore, the trace length of the output value Vabyfs of the upstream air-fuel ratio sensor is short. Also, the absolute value of the differential value d(Vabyfs)/dt (rate of change ΔAF) of the output value Vabyfs is small, as indicated by the broken line C3 in FIG. 3C.

On the other hand, if "the fuel injection valve that injects fuel into a particular cylinder (e.g., first cylinder)" is provided with "a characteristic that it injects a larger amount of fuel than the designated fuel injection amount", a difference in the air-fuel ratio among the cylinders becomes large. Namely, there arises a large difference between the air-fuel ratio of exhaust gas of the particular cylinder (the air-fuel ratio of the imbalance cylinder), and the air-fuel ratio of exhaust gases of the cylinders other than the particular cylinder (the air-fuel ratio of the non-imbalance cylinders).

Accordingly, when the degree of ununiformity in the air-fuel ratio among the cylinders becomes large, the output value Vabyfs largely fluctuates in a cycle of a unit combustion cycle period, as indicated by the solid line C2 in FIG. 3B, for example. Therefore, the trace length of the output value Vabyfs of the upstream air-fuel ratio sensor is increased. Also, when the degree of ununiformity in the air-fuel ratio among the cylinders becomes large, the absolute value of the differential value d(Vabyfs)/dt (the change rate ΔAF) becomes large, as indicated by the solid line C4 in FIG. 3C. In this connection, the unit combustion cycle period is a period it takes the engine to rotate by a crank angle required for all of the cylinders from which exhaust gases reaching the upstream air-fuel ratio sensor are emitted, to complete one combustion cycle of each cylinder.

Furthermore, the above-indicated trace length increases and the absolute value |ΔAF| of the change rate ΔAF fluctuates by a larger degree, as the air-fuel ratio of the imbalance cylinder deviates further (by a larger degree) from the air-fuel ratio of the non-imbalance cylinders. For example, if the output value Vabyfs varies as indicated by the solid line C2 in FIG. 3B when a difference between the air-fuel ratio of the imbalance cylinder and the air-fuel ratio of the non-imbalance cylinders is a first value, the output value Vabyfs varies as indicated by the one-dot chain line C2a in FIG. 3B when a difference between the air-fuel ratio of the imbalance cylinder and the air-fuel ratio of the non-imbalance cylinders is "a second value that is larger than the first value".

As is understood from the above description, the fluctuations in the output value Vabyfs of the upstream air-fuel ratio sensor become larger as the degree of ununiformity in the air-fuel ratio among the cylinders is larger; therefore, an air-fuel ratio imbalance index value representing the degree of ununiformity in the air-fuel ratio among the cylinders can be acquired based on the output value Vabyfs.

In the meantime, when the engine 10 is in a transient operating condition, such as an accelerating condition or a decelerating condition, for example, the center of the air-fuel ratio (center air-fuel ratio) of the engine may largely vary at a relatively low frequency (see the broken line L1 of FIG. 4). Such variations in the center air-fuel ratio appear in the output value Vabyfs of the upstream air-fuel ratio sensor. Accordingly, the output value Vabyfs of the upstream air-fuel ratio sensor is in the form of a signal (see the solid line L3 of FIG. 5) obtained by superimposing a signal (see the solid line L2 of FIG. 4) indicative of fluctuations in the air-fuel ratio due to the ununiformity (or imbalance) in the air-fuel ratio among the cylinders, on a signal (see the broke line L1 of FIG. 4 and FIG. 5) indicative of fluctuations in the center air-fuel ratio of the engine.

In this case, the output value Vabyfs of the upstream air-fuel ratio sensor fluctuates largely even if the degree of ununiformity in the air-fuel ratio among the cylinders is small. For example, when the air-fuel ratio imbalance index value is calculated based on the differential value d(Vabyfs)/dt (the rate of change ΔAF, or slope) of the output value Vabyfs, the slope obtained when the center air-fuel ratio of the engine does not fluctuate is θ1 as shown in FIG. 4, whereas the slope obtained when the center air-fuel ratio of the engine fluctuates is θ2 (θ2>θ1) as shown in FIG. 5 even with the same degree of ununiformity in the air-fuel ratio among the cylinders. Consequently, if an air-fuel ratio imbalance index value is obtained based on the output value Vabyfs of the upstream air-fuel ratio sensor, the obtained air-fuel ratio imbalance index value may not accurately represent the degree of ununiformity in the air-fuel ratio among the cylinders.

Therefore, if it is determined based on the air-fuel ratio imbalance index value obtained as described above whether an imbalance condition in the air-fuel ratio among the cylinders occurs, an erroneous determination may be made. If "fuel amount increasing control for compensating for erroneous lean correction which will be described later" is performed based on the air-fuel ratio imbalance index value as described above, the air-fuel ratio of the engine may not be controlled to an appropriate air-fuel ratio.

SUMMARY OF THE INVENTION

The invention provides a fuel injection amount control system of a multi-cylinder internal combustion engine, which is able to acquire an accurate air-fuel ratio imbalance index value, using an output value of an upstream air-fuel ratio sensor.

A fuel injection amount control system of a multi-cylinder internal combustion engine according to a first aspect of the invention includes a three-way catalyst, an upstream air-fuel ratio sensor, a plurality of fuel injection valves, a designated fuel injection amount determining section, an injection command signal sending section, a high-pass filtering section, and an air-fuel ratio imbalance index value acquiring section.

The three-way catalyst is mounted at a position downstream of "an exhaust gathering portion of an exhaust passage of the engine" into which exhaust gases emitted from a plurality of cylinders of the multi-cylinder internal combustion engine are collected.

The upstream air-fuel ratio sensor is located between the exhaust gathering portion of the exhaust passage and the three-way catalyst.

Each of the above-indicated plurality of fuel injection valves is arranged to inject fuel contained in an air-fuel mixture supplied to a combustion chamber of each of the plurality of cylinders.

The designated fuel injection amount determining section determines "a command value indicative of the amount of fuel to be injected from each of the plurality of fuel injection valves (namely, designated fuel injection amount)", by "feedback-correcting (feedback control) the amount of fuel injected from the fuel injection valve based on at least an output value of the upstream air-fuel ratio sensor", so that the air-fuel ratio of exhaust gas flowing into the three-way catalyst coincides with a target air-fuel ratio.

The injection command signal sending section sends an injection command signal to the plurality of fuel injection valves, so that the fuel is injected from each of the fuel injection valves in an amount corresponding to the designated fuel injection amount.

The above-indicated high-pass filtering section performs a high-pass filtering operation on the output value of the upstream air-fuel ratio sensor, so as to obtain a post-high-pass-filtering output value. In other words, the time constant of the high-pass filtering operation performed by the high-pass filtering section is set to a value that permits fluctuations in the output value of the upstream air-fuel ratio sensor due to the degree of ununiformity in the air-fuel ratio among the cylinders to pass through the filter, but inhibits fluctuations in the output value of the upstream air-fuel ratio sensor due to fluctuations in the center air-fuel ratio of the engine from passing through the filter. The high-pass filtering operation may be a so-called "high-pass filtering operation by software", or may be "an operation using a high-pass filter as a hardware".

The above-indicated air-fuel ratio imbalance index value acquiring section acquires a value which increases as "the degree of ununiformity among the plurality of cylinders" in the air-fuel ratio of an air-fuel mixture supplied to the combustion chamber of each of the plurality of cylinders (the air-fuel ratio of each cylinder) is larger, and "which increases as fluctuations in the post-high-pass-filtering output value are larger", based on the post-high-pass-filtering output value.

The post-high-pass-filtering output value approaches a value obtained by removing fluctuations in "the center air-fuel ratio of the engine" contained in the output value of the upstream air-fuel ratio sensor, from the output value of the upstream air-fuel ratio sensor. Namely, through the high-pass filtering operation, the output value as indicated by the solid line L3 in FIG. 5 is converted into the output value as indicated by the solid line L2 in FIG. 4. Accordingly, the post-high-pass-filtering output value varies depending on the degree of ununiformity in the air-fuel ratio among the cylinders, without being influenced by fluctuations in the center air-fuel ratio of the engine. Thus, an air-fuel ratio imbalance index value that accurately represents the degree of ununiformity in the air-fuel ratio among the cylinders can be acquired, based on the post-high-pass-filtering output value.

A fuel injection amount control system of a multi-cylinder internal combustion engine according to a second aspect of the invention includes: a three-way catalyst mounted at a position downstream of an exhaust gathering portion of an exhaust passage of the engine into which exhaust gases emitted from a plurality of cylinders of the multi-cylinder internal combustion engine are collected, an upstream air-fuel ratio sensor located between the exhaust gathering portion of the exhaust passage and the three-way catalyst, a plurality of fuel injection valves each of which is arranged to inject fuel to be contained in an air-fuel mixture supplied to a combustion chamber of each of the plurality of cylinders, a designated fuel injection amount determining section that determines a designated fuel injection amount as a command value indicative of an amount of fuel injected from each fuel injection valve, by feedback-correcting the amount of fuel injected from each fuel injection valve based on at least an output value of the upstream air-fuel ratio sensor, so that an air-fuel ratio of exhaust gas flowing into the three-way catalyst coincides with a target air-fuel ratio, an injection command signal sending section that sends an injection command signal to the plurality of fuel injection valves so that the fuel is injected from each fuel injection valve in an amount corresponding to the designated fuel injection amount, a component extracting section that extracts "a component that varies in a cycle of one unit combustion cycle period" as a period corresponding to a crank angle required for all of the cylinders from which the exhaust gases that reach the upstream air-fuel ratio sensor are emitted to complete one combustion cycle of each cylinder, from the output value of the upstream air-fuel ratio sensor, and an air-fuel ratio imbalance index value acquiring section that acquires an air-fuel ratio imbalance index value which increases as a degree of ununiformity in the air-fuel ratio of the air-fuel mixture supplied to the combustion chamber of each of the plurality of cylinders, among the plurality of cylinders, is larger, and "which increases as fluctuations in the extracted component are larger", based on the extracted component.

According to the above aspects of the invention, the air-fuel ratio imbalance index value accurately represents the degree of ununiformity in the air-fuel ratio among the cylinder; therefore, the above-mentioned fuel amount increasing control for compensating for erroneous lean correction is appropriately carried out according to the degree of ununiformity in the air-fuel ratio among the cylinders. Consequently, an influence of the erroneous lean correction can be reduced, and the fuel is prevented from being excessively increased, resulting in reduction of the amount of emissions (NOx and unburned substances).

A fuel injection amount control device of a multi-cylinder internal combustion engine according to a third aspect of the invention includes: a three-way catalyst mounted at a position downstream of an exhaust gathering portion of an exhaust passage of the engine into which exhaust gases emitted from a plurality of cylinders of the multi-cylinder internal combustion engine are collected; an upstream air-fuel ratio sensor located between the exhaust gathering portion of the exhaust passage and the three-way catalyst; and a plurality of fuel injection valves each of which is arranged to inject fuel to be contained in an air-fuel mixture supplied to a combustion chamber of each of said plurality of cylinders; the fuel injection amount control device including: a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio; an injection command signal sending section that sends an injection command signal to said plurality of fuel injection valves so that the fuel is injected from said each fuel injection valve in an amount corresponding to the designated fuel injection amount; a high-pass filtering section that performs a high-pass filtering operation on the output value of the upstream air-fuel ratio sensor, so as to obtain a post-high-pass-filtering output value; and an air-fuel ratio imbalance index value acquiring section that acquires an air-fuel ratio imbalance index value which increases as a degree of ununiformity in the air-fuel ratio of the air-fuel mixture supplied to the combustion chamber of each of said plurality of cylinders, among said plurality of cylinders, is larger, and which increases as fluctuations in the post-high-pass-filtering output value are larger, based on the post-high-pass-filtering output value.

The fuel injection amount control device according to the third aspect of the invention provides substantially the same effects as those of the fuel injection amount control system according to the first aspect of the invention.

A fuel injection amount control device of a multi-cylinder internal combustion engine according to a fourth aspect of the invention including: a three-way catalyst mounted at a position downstream of an exhaust gathering portion of an exhaust passage of the engine into which exhaust gases emitted from a plurality of cylinders of the multi-cylinder internal combustion engine are collected; an upstream air-fuel ratio sensor located between the exhaust gathering portion of the exhaust passage and the three-way catalyst; and a plurality of fuel injection valves each of which is arranged to inject fuel to be contained in an air-fuel mixture supplied to a combustion chamber of each of said plurality of cylinders; the fuel injection amount control device including: a designated fuel injection amount determining section that determines a designated fuel injection amount as a command value indicative of an amount of fuel injected from each of said plurality of fuel injection valves, by feedback-correcting the amount of fuel injected from said each fuel injection valve based on at least an output value of the upstream air-fuel ratio sensor, so that an air-fuel ratio of exhaust gas flowing into the three-way catalyst coincides with a target air-fuel ratio; an injection command signal sending section that sends an injection command signal to said plurality of fuel injection valves so that the fuel is injected from said each fuel injection valve in an amount corresponding to the designated fuel injection amount; a component extracting section that extracts a component that varies in a cycle of one unit combustion cycle period as a period corresponding to a crank angle required for all of the cylinders from which the exhaust gases that reach the upstream air-fuel ratio sensor are emitted to complete one combustion cycle of each cylinder, from the output value of the upstream air-fuel ratio sensor; and an air-fuel ratio imbalance index value acquiring section that acquires an air-fuel ratio imbalance index value which increases as a degree of ununiformity in the air-fuel ratio of the air-fuel mixture supplied to the combustion chamber of each of said plurality of cylinders, among said plurality of cylinders, is larger, and which increases as fluctuations in the extracted component are larger, based on the extracted component.

The fuel injection amount control device according to the fourth aspect of the invention provides substantially the same effects as those of the fuel injection amount control system according to the second aspect of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 15 is a flowchart illustrating a routine executed by the CPU of the control device;

FIG. 16A and FIG. 16B are a flowchart illustrating a routine executed by the CPU of the control device;

DETAILED DESCRIPTION OF EMBODIMENTS

A fuel injection amount control device (which will also be simply called "control device") of an internal combustion engine according to an embodiment of the invention will be described with reference to the drawings. This control device is a part of an air-fuel ratio control system for controlling the air-fuel ratio of an air-fuel mixture supplied to the internal combustion engine (the air-fuel ratio of the engine).

Figure 1:
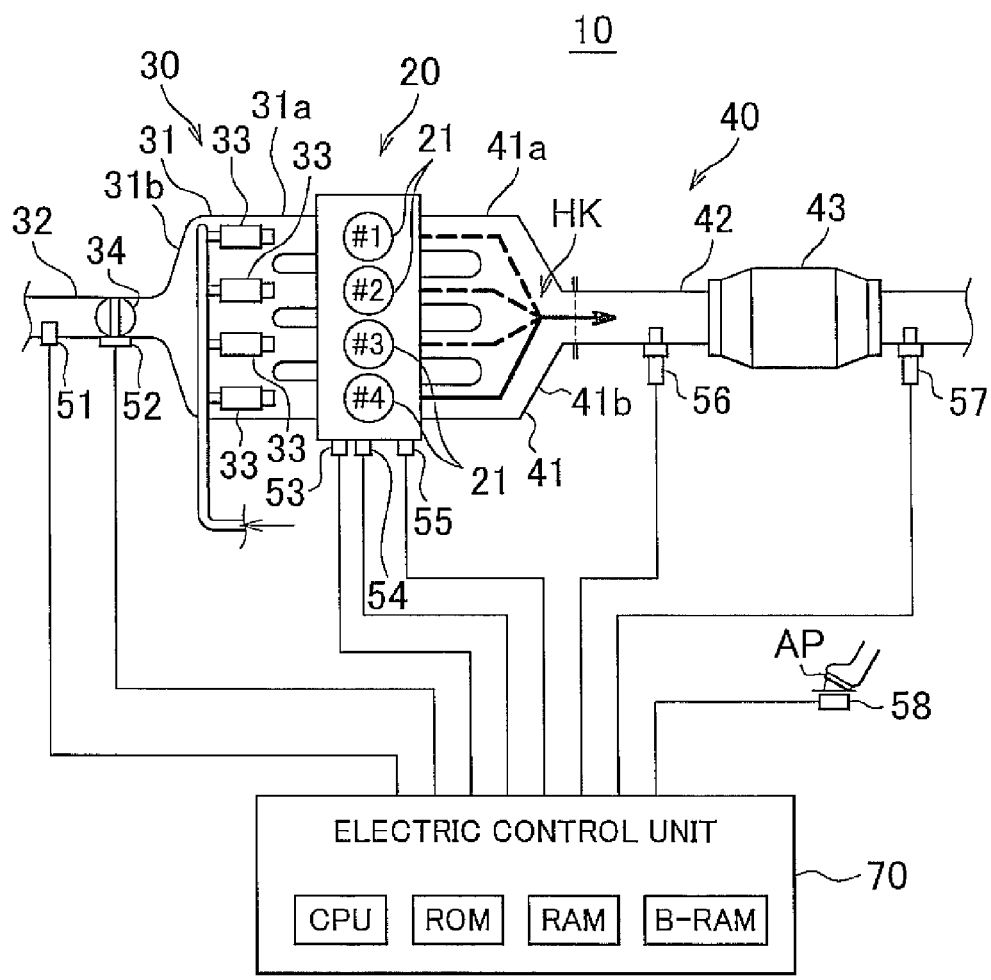
FIG. 1 is a schematic view of an internal combustion engine to which a fuel injection amount control system according to an embodiment of the invention is applied.

(Construction of an Embodiment) FIG. 1 schematically shows the construction of a system in which a control device (which will also be called "control device") according to an embodiment of the invention is applied to a four-cycle, spark ignition type, multi-cylinder (in-line four cylinder), internal combustion engine 10.

The internal combustion engine 10 includes an engine main body 20, an intake system 30, and an exhaust system 40.

The engine main body 20 includes a cylinder block portion and a cylinder head portion. The engine main body 20 has a plurality of cylinders (combustion chambers) 21. Each cylinder communicates with "an intake port and an exhaust port" which are not illustrated. A communicating portion that communicates the intake port with the corresponding combustion chamber 21 is opened and closed by an intake valve (not shown). A communicating portion that communicates the exhaust port with the corresponding combustion chamber 21 is opened and closed by an exhaust valve (not shown). An ignition plug (not shown) is provided in each combustion chamber 21.

The intake system 30 has an intake manifold 31, an intake pipe 32, a plurality of fuel injection valves 33, and a throttle valve 34.

The intake manifold 31 has a plurality of branch portions 31a and a surge tank 31b. Each of the branch portions 31a is connected at one end to a corresponding one of a plurality of intake ports. The other ends of the branch portions 31a are connected to the surge tank 31b.

One end of the intake pipe 32 is connected to the surge tank 31b. An air filter (not shown) is provided at the other end of the intake pipe 32.

One fuel injection valve 33 is provided for one cylinder (combustion chamber) 21. The fuel injection valve 33 is disposed in the corresponding intake port. Namely, each of the cylinders is provided with the fuel injection valve 33 that supplies fuel to the cylinder, independently of the other cylinders. The fuel injection valve 33 operates in response to an injection command signal, and injects "fuel in a designated fuel injection amount included in the injection command signal" into the intake port (accordingly, into the cylinder corresponding to the fuel injection valve 33) when the valve 33 operates normally.

More specifically, the fuel injection valve 33 opens only for a period of time proportional to the designated fuel injection amount. The pressure of the fuel supplied to the fuel injection valve 33 is controlled by a pressure regulator (not shown) so that a difference between the pressure of the fuel and the pressure in the intake port becomes constant. Accordingly, the fuel injection valve 33, when in normal operation, injects fuel in an amount equal to the designated fuel injection amount. If, however, an abnormality occurs to the fuel injection valve 33, the fuel injection valve 33 would inject fuel in an amount different from the designated fuel injection amount. As a result, ununiformity or imbalance arises in the air-fuel ratio among individual cylinders.

The throttle valve 34 is pivotally mounted in the intake pipe 32. The throttle valve 34 is operable to make the cross-sectional area of the intake passage variable. In operation, the throttle valve 34 is rotated/driven by a throttle valve actuator (not shown) in the intake pipe 32.

The exhaust system 40 has an exhaust manifold 41, an exhaust pipe 42, an upstream catalyst 43 disposed in the exhaust pipe 42, and "a downstream catalyst (not shown)" located downstream of the upstream catalyst 43 in the exhaust pipe 42.

The exhaust manifold 41 has a plurality of branch portions 41a and a gathering portion 41b. Each of the branch portions 41a is connected at one end to a corresponding one of a plurality of exhaust ports. The other ends of the branch portions 41a join into the gathering portion 41b. The gathering portion 41b, into which exhaust gases emitted from a plurality of (two or more, four in this embodiment) cylinders gather, will also be called exhaust gathering portion HK.

The exhaust pipe 42 is connected to the gathering portion 41b. The exhaust ports, exhaust manifold 41 and the exhaust pipe 42 constitute an exhaust passage.

Each of the upstream catalyst 43 and downstream catalyst is a so-called three-way catalytic device (catalyst for cleaning exhaust gas) that supports an active ingredient comprising a noble metal (catalytic substance), such as platinum, rhodium, and palladium. Each catalyst has the function of oxidizing unburned components, such as HC, CO and $H_2$, and reducing nitrogen oxides (NOx), when the air-fuel ratio of gas flowing into each catalyst is "an air-fuel ratio (e.g., stoichiometric air-fuel ratio) within the window of the three-way catalyst". This function may also be called "catalytic function". In addition, each catalyst has an oxygen storage function of adsorbing (storing) oxygen. Owing to the oxygen storage function, each catalyst is able to remove or convert unburned components and nitrogen oxides even when the air-fuel ratio is shifted from the stoichiometric ratio. Namely, the width of the above-mentioned window increases due to the oxygen storage function. The oxygen storage function is provided by an oxygen storage material, such as ceria ($CeO_2$) supported on the catalyst.

The system of FIG. 1 has a hot-wire airflow meter 51, a throttle position sensor 52, a water temperature sensor 53, a crank position sensor 54, an intake cam position sensor 55, an upstream air-fuel ratio sensor 56, a downstream air-fuel ratio sensor 57, and an acceleration stroke sensor 58.

The airflow meter 51 generates a signal indicative of the mass flow (intake air flow rate) Ga of intake air flowing in the intake pipe 32. Namely, the intake air amount Ga represents the amount of intake air drawn into the engine 10 per unit time.

The throttle position sensor 52 detects the opening of the throttle valve 34 (throttle opening), and generates a signal indicative of the throttle opening TA.

The water temperature sensor 53 detects the temperature of a coolant of the internal combustion engine 10, and generates a signal indicative of the coolant temperature THW. The coolant temperature THW is a parameter representing a warm-up condition of the engine 10 (the temperature of the engine 10).

The crank position sensor 54 generates a signal having small-width pulses generated each time the crankshaft rotates 10°, and large-width pulses generated each time the crankshaft rotates 360°. The signal is converted into the engine speed NE by an electric control unit 70 which will be described later.

The intake cam position sensor 55 generates one pulse each time the intake camshaft rotates 90° from a given angle, then 90°, and then 180°. The electric control unit 70 which will be described later obtains an absolute crank angle CA with reference to the compression top dead center of a reference cylinder (e.g., first cylinder), based on the signals from the crank position sensor 54 and the intake cam position sensor 55. The absolute crank angle CA is set to "0° crank angle" at the compression top dead center of the reference cylinder, increases up to 720° crank angle according to the angle of rotation of the crankshaft, and is set again to 0° crank angle at the time when it reaches 720° crank angle.

The upstream air-fuel ratio sensor 56 is mounted in "either the exhaust manifold 41 or the exhaust pipe 42" at a position between the gathering portion 41b (exhaust gathering portion HK) of the exhaust manifold 41 and the upstream catalyst 43. The upstream air-fuel ratio sensor 56 may also be simply called "air-fuel ratio sensor".

The upstream air-fuel ratio sensor 56 is a "limiting current type wide range air-fuel ratio sensor having a diffusion resistance layer" as disclosed in, for example, Japanese Patent Application Publication No. 11-72473 (JP-A-11-72473), Japanese Patent Application Publication No. 2000-65782 (JP-A-2000-65782), and Japanese Patent Application Publication No. 2004-69547 (JP-A-2004-69547).

Figure 6:
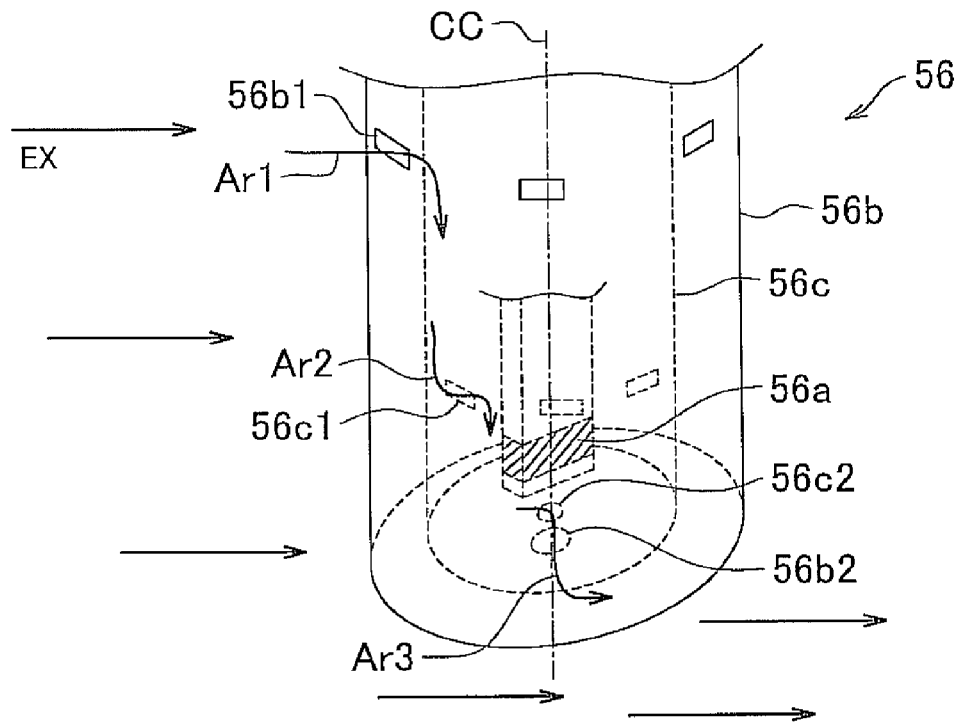
FIG. 6 is a schematic perspective view of a part of an upstream air-fuel ratio sensor shown in FIG. 1.
Figure 7:
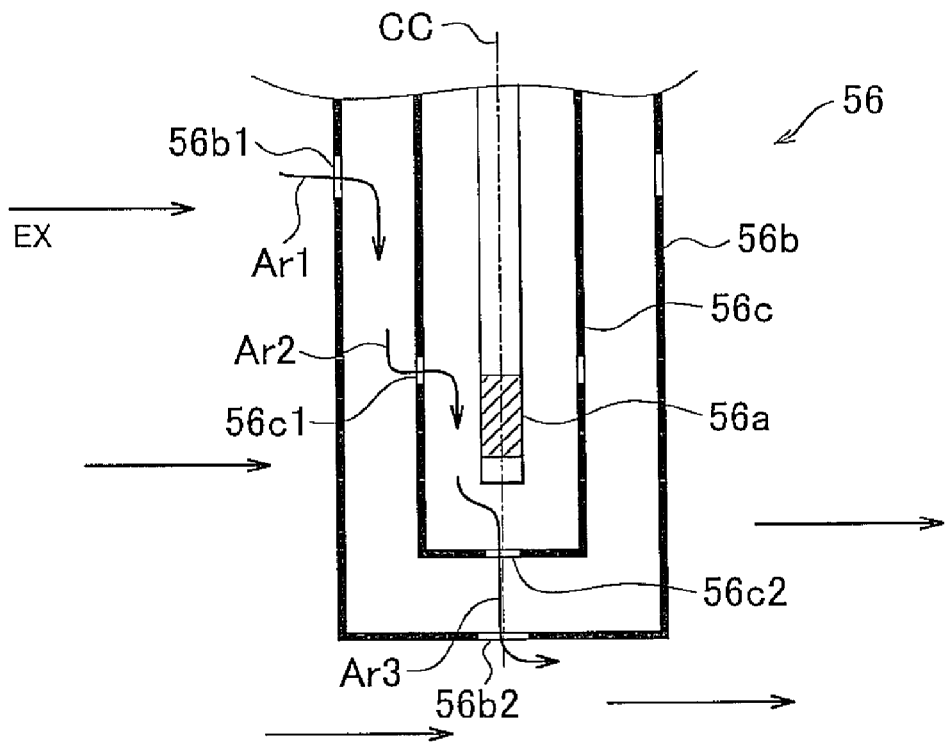
FIG. 7 is a cross-sectional view of a part of the upstream air-fuel ratio sensor shown in FIG. 1.

As shown in FIG. 6 and FIG. 7, the upstream air-fuel ratio sensor 56 has an air-fuel ratio sensing portion 56a, an outer protective cover 56b, and an inner protective cover 56c.

The outer protective cover 56a is a hollow cylindrical body made of metal. The inner protective cover 56c is housed in the outer protective cover 56b such that the outer protective cover 56b surrounds the inner protective cover 56c. The outer protective cover 56b has a plurality of inlet holes 56b1 formed through its side face. The inlet holes 56b1 are through holes that permit exhaust gas EX flowing in the exhaust passage (exhaust gas present outside the outer protective cover 56b) to flow into the inside of the outer protective cover 56b. In addition, the outer protective cover 56b has an outlet hole 56b2 formed through its bottom face, and the outlet hole 56b2 permits exhaust gas within the outer protective cover 56b to flow out to the outside (exhaust passage).

The inner protective cover 56c is a hollow cylindrical body made of metal and having a smaller diameter than that of the outer protective cover 56b. The air-fuel ratio sensing portion 56a is housed in the inner protective cover 56c, such that the inner protective cover 56c surrounds the air-fuel ratio sensing portion 56a. The inner protective cover 56c has a plurality of inlet holes 56c1 formed through its side face. The inlet holes 56c1 are through holes that permit exhaust gas that has entered "space between the outer protective cover 56b and the inner protective cover 56c" through the inlet holes 56b1 of the outer protective cover 56b, to flow into the inside of the inner protective cover 56c. In addition, the inner protective cover 56c has an outlet hole 56c2 formed through its bottom face, and the outlet hole 56c2 permits exhaust gas within the inner protective cover 56c to flow out to the outside.

Figure 8A:
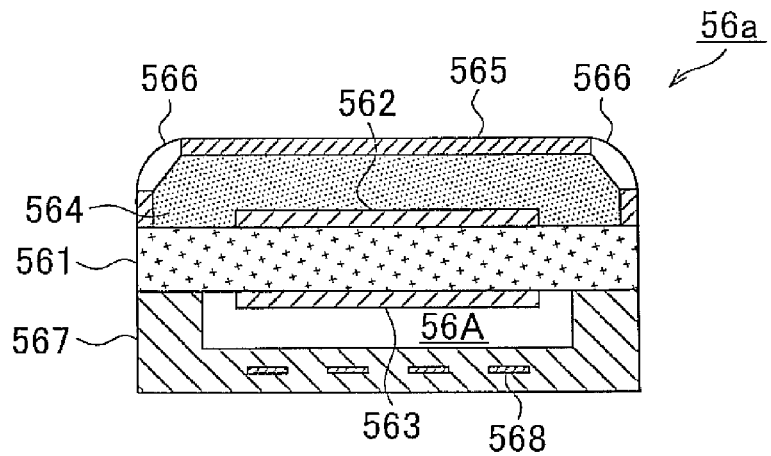
FIG. 8A to FIG. 8C are schematic cross-sectional views each showing an air-fuel ratio sensing portion included in the upstream air-fuel ratio sensor shown in FIG. 1.
Figure 8B:
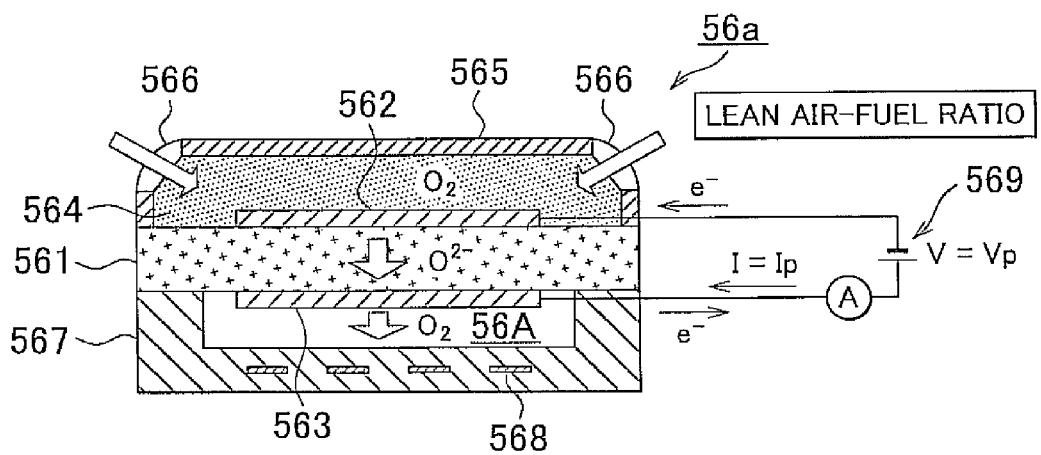
Figure 8C:
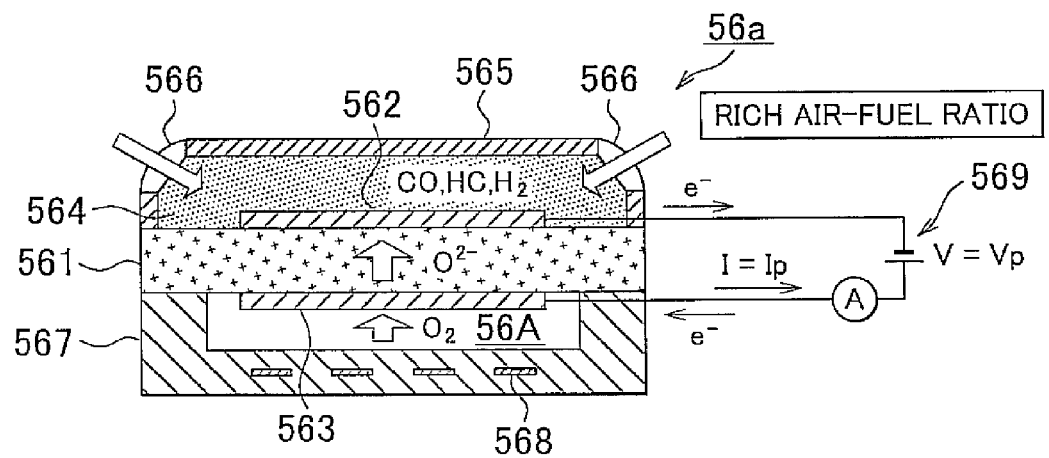

As shown in FIG. 8A through FIG. 8C, the air-fuel ratio sensing portion 56a includes a solid electrolyte layer 561, an exhaust-gas-side electrode layer 562, an atmosphere-side electrode layer 563, a diffusion resistance layer 564, a first wall portion 565, a catalyst portion 566, a second wall portion 567, and a heater 568.

The solid electrolyte layer 561 is a sintered body of an oxygen-ion-conductive oxide. In this embodiment, the solid electrolyte layer 561 is a "stabilized zirconia element" formed by dissolving CaO as a stabilizer in $ZrO_2$ (zirconia). The solid electrolyte layer 561 exhibits known "oxygen cell characteristics" and "oxygen pump characteristics" when its temperature is equal to or higher than an activating temperature.

The exhaust-gas-side electrode layer 561 is made of a noble metal, such as platinum (Pt), having a high catalytic activity. The exhaust-gas-side electrode layer 561 is formed on one surface of the solid electrolyte layer 561. The exhaust-gas-side electrode layer 562 is formed by chemical plating, or the like, so as to provide sufficient permeability (namely, it is formed as a porous layer).

The atmosphere-side electrode layer 563 is made of a noble metal, such as platinum (Pt), having a high catalytic activity. The atmosphere-side electrode layer 563 is formed on the other surface of the solid electrolyte layer 561, so as to be opposed to the exhaust-gas-side electrode layer 561 with the solid electrolyte layer 561 interposed therebetween. The atmosphere-side electrode layer 563 is formed by chemical plating, or the like, so as to provide sufficient permeability (namely, it is formed as a porous layer).

The diffusion resistance layer (diffusion-controlling or diffusion-limited layer) 564 is made of a porous ceramic material (heat-resisting inorganic substance). The diffusion resistance layer 564 is formed by, for example, plasma spraying, or the like, so as to cover the outer surface of the exhaust-gas-side electrode layer 562.

The first wall portion 565 is made of alumina as a ceramic that is dense and inhibits gas from passing therethrough. The first wall portion 565 is formed so as to cover the diffusion resistance layer 564 except for a corner portion (a part) of the diffusion resistance layer 564. Namely, the first wall portion 565 has a through portion that allows a part of the diffusion resistance layer 564 to be exposed to the outside.

The catalyst portion 566 is formed in the through portion so as to close the through portion of the first wall portion 565. Like the upstream catalyst 43, the catalyst portion 566 supports a catalyst substance that promotes oxidation-reduction reaction, and an oxygen storage material having an oxygen storage function. The catalyst portion 566 has a porous structure. Accordingly, exhaust gas (i.e., exhaust gas that has entered the inner protective cover 56c as described above) passes through the catalyst portion 566 and reaches the diffusion resistance layer 564, as indicated by white arrows in FIG. 8B and FIG. 8C, and the exhaust gas further passes through the diffusion resistance layer 564 and reaches the exhaust-gas-side electrode layer 562.

The second wall portion 567 is made of alumina as a ceramic that is dense and inhibits gas from passing therethrough. The second wall portion 567 is arranged to form "an atmosphere chamber 56A" as a space in which the atmosphere-side electrode layer 563 is housed. The atmosphere is introduced into the atmosphere chamber 56A.

A power supply 569 is connected to the upstream air-fuel ratio sensor 56. The power supply 569 applies a voltage V (=Vp) to the upstream air-fuel ratio sensor 56 so that the atmosphere-side electrode layer 563 is at a high potential, and the exhaust-gas-side electrode layer 562 is at a low potential.

The heater 568 is embedded in the second wall portion 567. The heater 568 generates heat when it is energized by the electric control unit 70 (which will be described later), so as to heat the solid electrolyte layer 561, exhaust-gas-side electrode layer 562 and the atmosphere-side electrode layer 563, and control the temperatures thereof.

Figure 9:
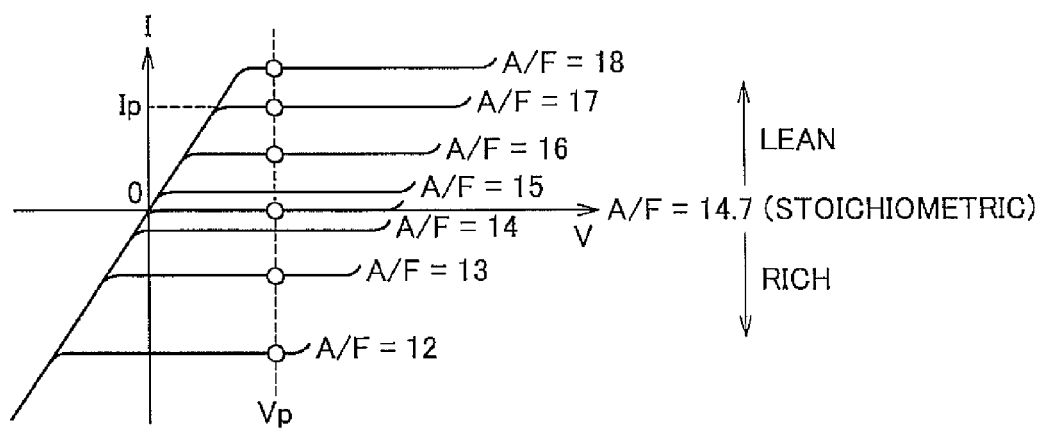
FIG. 9 is a graph relating to the embodiment of the invention, and indicating the relationship between the air-fuel ratio (the upstream air-fuel ratio) of exhaust gas and a limiting current value of the air-fuel ratio sensor.

When the air-fuel ratio of exhaust gas is leaner or larger than the stoichiometric air-fuel ratio, the upstream air-fuel ratio sensor 56 constructed as described above causes oxygen that reaches the exhaust-gas-side electrode layer 562 through the diffusion resistance layer 564, to be ionized and passed through the solid electrolyte layer 561 toward the atmosphere-side electrode layer 563, as shown in FIG. 8B. As a result, current I flows from the positive electrode to negative electrode of the power supply 569. As shown in FIG. 9, where the voltage V is set to a predetermined value Vp or higher, the magnitude of the current I becomes a constant value that is proportional to the concentration of oxygen that reaches the exhaust-gas-side electrode layer 562 (the oxygen partial pressure, the air-fuel ratio of exhaust gas). The upstream air-fuel ratio sensor 56 generates a value (in voltage) into which this current (i.e., the limiting current Ip) is converted, as an output value Vabyfs.

On the other hand, when the air-fuel ratio of exhaust gas is richer or smaller than the stoichiometric air-fuel ratio, the upstream air-fuel ratio sensor 56 causes oxygen present in the atmosphere chamber 56A to be ionized and led to the exhaust-gas-side electrode layer 562, so as to oxidize unburned substances (such as HC, CO and $H_2$) that reaches the exhaust-gas-side electrode layer 562 through the diffusion resistance layer 564, as shown in FIG. 8C. As a result, current I flows from the negative electrode to positive electrode of the power supply 569. As shown in FIG. 9, where the voltage V is set to a predetermined value Vp or higher, the magnitude of this current I becomes a constant value that is proportional to the concentration of the unburned substances that reach the exhaust-gas-side electrode layer 562 (namely, the air-fuel ratio of exhaust gas). The upstream air-fuel ratio sensor 56 generates a value (in voltage) into which this current (i.e., the limiting current Ip) is converted, as an output value Vabyfs.

Figure 10:
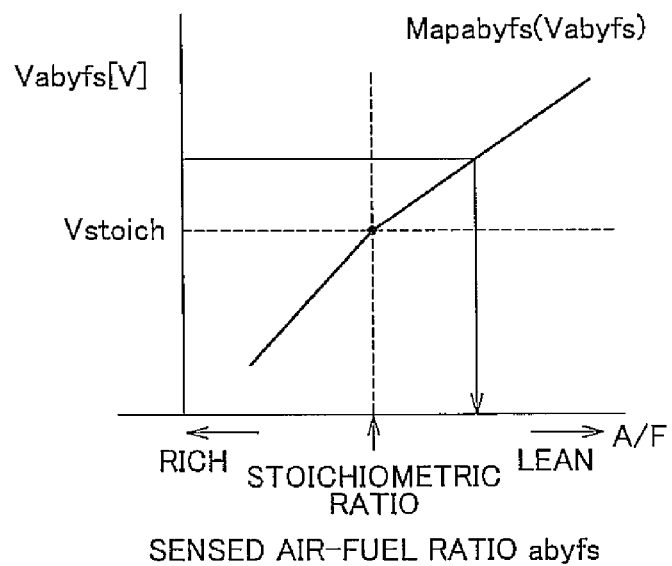
FIG. 10 is a graph relating to the embodiment of the invention, and indicating the relationship between the air-fuel ratio (the upstream air-fuel ratio) of exhaust gas and the output value of the air-fuel ratio sensor.

Namely, the air-fuel ratio sensing portion 56a generates the output value Vabyfs commensurate with the air-fuel ratio of gas that flows at a location where the upstream air-fuel ratio sensor 56 is disposed, and reaches the air-fuel ratio sensing portion 56a through the inlet holes 56b1 of the outer protective cover 56b and the inlet holes 56c1 of the inner protective cover 56c, as "air-fuel ratio sensor output". The output value Vabyfs increases as the air-fuel ratio of the gas that reaches the air-fuel ratio sensing portion 56a becomes larger (or leaner). Namely, the output value Vabyfs is substantially proportional to the air-fuel ratio of the exhaust gas that reaches the air-fuel ratio sensing unit 56a, as shown in FIG. 10. When the air-fuel ratio of the gas that reaches the air-fuel ratio sensing portion 56a is the stoichiometric air-fuel ratio, the output value Vabyfs is equal to a value Vstoich corresponding to the stoichiometric air-fuel ratio.

Thus, the upstream air-fuel ratio sensor 56 can be said to be "an air-fuel ratio sensor which is mounted at a location between the exhaust gathering portion HK and the three-way catalyst 43 in the exhaust passage of the engine 10, and which has the air-fuel ratio sensing element (solid electrolyte layer) 561, the exhaust-gas-side electrode layer 562 and atmosphere-side electrode layer (reference-gas-side electrode layer) 563 that are positioned to be opposed to each other with the air-fuel ratio sensing element 561 interposed therebetween, and the porous layer (diffusion resistance layer) 564 that covers the exhaust-gas-side electrode layer, the air-fuel ratio sensor being operable to generate an output value commensurate with the amount of oxygen (oxygen concentration, oxygen partial pressure) and the amount of unburned substances (concentration of unburned substances, partial pressure of unburned substances) contained in the exhaust gas that reaches the exhaust-gas-side electrode layer 562 through the porous layer 564, out of the exhaust gas that passes the location where the air-fuel ratio sensor is mounted".

The electric control unit 70 stores an air-fuel ratio conversion table (map) Mapabyfs as shown in FIG. 10. The electric control unit 70 applies the air-fuel ratio conversion table Mapabyfs to the output value Vabyfs of the upstream air-fuel ratio sensor 56, thereby to detect the actual upstream-side air-fuel ratio abyfs (namely, obtain the detected air-fuel ratio abyfs).

In the meantime, the unburned substances contained in the exhaust gas and including hydrogen are converted to some extent at the catalyst portion 566, into harmless substances. However, when a large amount of unburned substances are contained in the exhaust gas, the unburned substances cannot be completely converted or removed at the catalyst portion 566. As a result, "oxygen, and excessive unburned substances compared to the oxygen" may reach the outer surface of the diffusion resistance layer 564. Also, since hydrogen has a smaller molecular size than the other unburned substances, as described above, hydrogen preferentially diffuses into the diffusion resistance layer 564, as compared with the other unburned substances.

In addition, the upstream air-fuel ratio sensor 56 is mounted at a location between the exhaust gathering portion HK and the upstream catalyst 43. Furthermore, the upstream air-fuel ratio sensor 56 is located such that the outer protective cover 56b is exposed to either the inside of the exhaust manifold 41 or the inside of the exhaust pipe 42.

More specifically, the upstream air-fuel ratio sensor 56 is placed in the exhaust passage, as shown in FIG. 6 and FIG. 7, such that the bottom faces of the protective covers (56b, 56c) extend in parallel with the flow of the exhaust gas EX, and the center axis CC of the protective covers (56b, 56c) is perpendicular to the flow of the exhaust gas EX. With this arrangement, the exhaust gas EX in the exhaust passage, which has reached the inlet holes 56b1 of the outer protective cover 56b, is sucked or drawn into the outer protective cover 56b and the inner protective cover 56c, due to the flow of the exhaust gas EX in the exhaust passage, which flows in the vicinity of the outlet hole 56b2 of the outer protective cover 56b.

Accordingly, the exhaust gas EX that flows in the exhaust passage passes through the inlet holes 56b1 of the outer protective cover 56b, and flows into the space between the outer protective cover 56b and the inner protective cover 56c, as indicated by arrow Ar1 in FIG. 6 and FIG. 7. Then, the exhaust gas flows into "the inside of the inner protective cover 56c" through "the inlet holes 56c1 of the inner protective cover 56c" as indicated by arrow Ar2, and then reaches the air-fuel ratio sensing portion 56a. Thereafter, the exhaust gas passes through "the outlet hole 56c2 of the inner protective cover 56c and the outlet hole 56b2 of the outer protective cover 56b", and flows out into the exhaust passage, as indicated by arrow Ar3 in FIG. 6 and FIG. 7.

Therefore, the flow rate of the exhaust gas within "the outer protective cover 56b and the inner protective cover 56c" varies according to the flow rate of the exhaust gas EX that flows in the vicinity of the outlet hole 56b2 of the outer protective cover 56b (accordingly, the intake air amount Ga as the amount of intake air per unit time). In other words, the length of time from "a point in time at which exhaust gas (first exhaust gas) having a certain air-fuel ratio reaches the inlet hole 56b1" to "a point in time at which the first exhaust gas reaches the air-fuel ratio sensing portion 56a" depends on the intake air amount Ga, but does not depend on the engine speed NE. Accordingly, the output response (response) of the upstream air-fuel ratio sensor 56 to "the air-fuel ratio of exhaust gas flowing in the exhaust passage" gets better as the amount (flow rate) of the exhaust gas flowing in the vicinity of the outer protective cover 56b of the upstream air-fuel ratio sensor 56 is larger, namely, as the intake air amount Ga is larger. This is also true in the case where the upstream air-fuel ratio sensor 56 has only the inner protective cover 56c.

Referring again to FIG. 1, the downstream air-fuel ratio sensor 57 is mounted in the exhaust pipe 42. The downstream air-fuel ratio sensor 57 is located downstream of the upstream catalyst 43 and upstream of the downstream catalyst (namely, in the exhaust passage between the upstream catalyst 43 and the downstream catalyst). The downstream air-fuel ratio sensor 57 is a known electromotive force type oxygen concentration sensor (a known concentration cell type oxygen concentration sensor using a solid electrolyte, such as stabilized zirconia). The downstream air-fuel ratio sensor 57 is operable to generate an output value Voxs commensurate with the sensed air-fuel ratio of gas passing through a portion of the exhaust passage in which the downstream air-fuel ratio sensor 57 is mounted. In other words, the output value Voxs is commensurate with or relates to the air-fuel ratio of gas that flows out of the upstream catalyst 43 and flows into the downstream catalyst.

Figure 11:
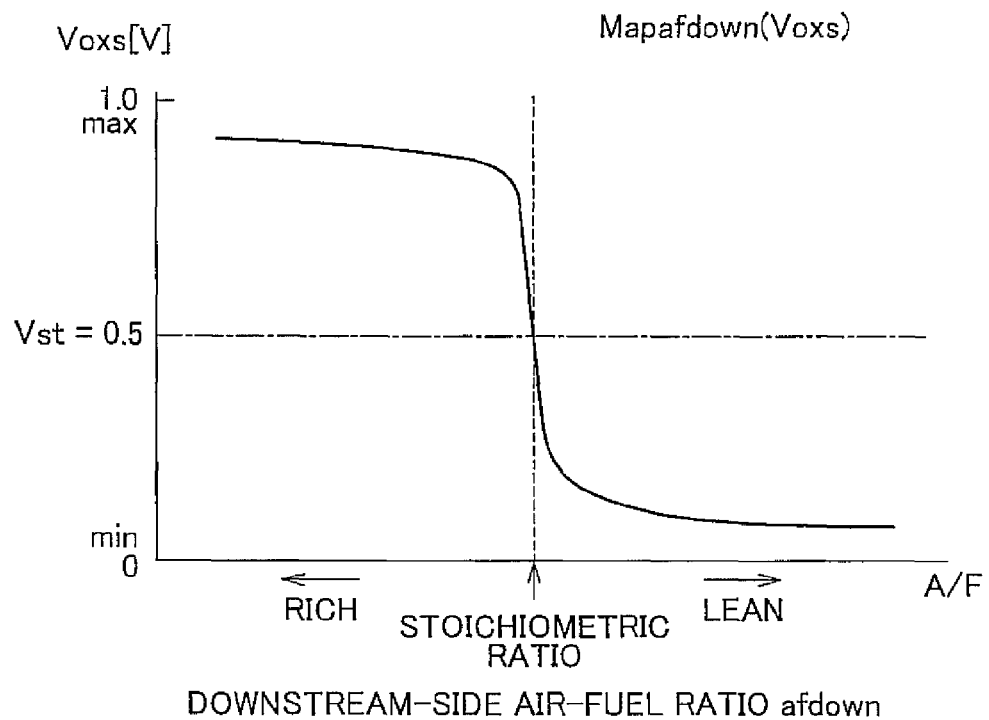
FIG. 11 is a graph relating to the embodiment of the invention, and indicating the relationship between the air-fuel ratio (the downstream air-fuel ratio) of exhaust gas and the output value of a downstream air-fuel ratio sensor shown in FIG. 1.

As shown in FIG. 11, the output value Vox becomes equal to the maximum output value max (e.g., about 0.9V-1.0V) when the sensed air-fuel ratio of the gas is richer than the stoichiometric air-fuel ratio. The output value Voxs becomes equal to the minimum output value min (e.g., about 0.1V-0V) when the sensed air-fuel ratio of the gas is leaner than the stoichiometric ratio. Further, when the sensed air-fuel ratio of the gas is equal to the stoichiometric ratio, the output value Voxs becomes equal to a voltage Vst (intermediate voltage Vst, for example, about 0.5V) substantially intermediate between the maximum output value max and the minimum output value min. The output value Voxs rapidly changes from the maximum output value max to the minimum output value min when the sensed air-fuel ratio of the gas changes from an air-fuel ratio that is richer than the stoichiometric ratio to an air-fuel ratio that is leaner than the stoichiometric ratio. Similarly, the output value Voxs rapidly changes from the minimum output value min to the maximum output value max when the sensed air-fuel ratio of the gas changes from an air-fuel ratio that is leaner than the stoichiometric ratio to an air-fuel ratio that is richer than the stoichiometric ratio.

The downstream air-fuel ratio sensor 57 has a solid electrolyte layer, and "an exhaust-gas-side electrode layer and an atmosphere-side (reference-gas-side) electrode layer" which are disposed on the opposite surfaces of the solid electrolyte layer such that the electrode layers are opposed to each other with the solid electrolyte layer interposed therebetween, and the exhaust-gas-side electrode layer is covered with a porous layer (protective layer). Accordingly, the gas to be sensed is converted into oxygen-balanced gas (gas obtained after oxygen and unburned substances are chemically combined) when it passes through the porous layer, and reaches the exhaust-gas-side electrode layer. Hydrogen passes through the porous layer more easily than the other unburned substances. It is to be noted that "excessive hydrogen generated when an imbalance in the air-fuel ratio among individual cylinders occurs" is converted and removed by means of the upstream catalyst 43, except for special cases. Accordingly, except for special cases, the output value Voxs of the downstream air-fuel ratio sensor 57 does not change depending on the degree of ununiformity or imbalance in the air-fuel ratio among cylinders.

The acceleration stroke sensor 58 as shown in FIG. 1 is operable to generate a signal indicative of the amount of operation Accp of the accelerator pedal AP operated by the driver (the accelerator pedal operation amount, the stroke or position of the accelerator pedal AP). The accelerator pedal operation amount Accp increases as the amount of operation of the accelerator pedal AP increases.

The electric control unit 70 is a known microcomputer comprising "CPU, ROM in which programs to be executed by the CPU, tables (maps, functions), constants, etc. are stored in advance, RAM in which the CPU temporarily stores data as needed, backup RAM, interfaces including AD converters, etc.".

The backup RAM is supplied with electric power from a battery installed on the vehicle, irrespective of the position (any of OFF position, START position and ON position) of an ignition key switch (not shown) of the vehicle on which the engine 10 is installed. The backup RAM, when it is supplied with electric power from the battery, stores data in response to a command of the CPU (data is written into the backup RAM), and holds (stores) the data so that the data can be retrieved or read. Thus, the backup RAM is able to hold data even when the operation of the engine 10 is stopped.

The backup RAM cannot hold data if supply of electric power from the battery to the backup RAM is interrupted or stopped, such as when the battery is removed from the vehicle. Therefore, the CPU is configured to initialize data to be stored in the backup RAM (set data to default values) when the supply of electric power to the backup RAM is resumed. The backup RAM may be a non-volatile memory, such as EEPROM, from and into which data can be read and written.

The electric control unit 70 is connected to the above-described sensors, and signals are supplied from these sensors to the CPU. Also, the electric control unit 70 is adapted to send drive signals (command signals) to the ignition plug (actually, an igniter) provided for each cylinder, fuel injection valve 33 provided for each cylinder, the throttle valve actuator, and so forth, in response to commands of the CPU.

The electric control unit 70 sends a command signal to the throttle valve actuator, so that the throttle opening TA increases as the obtained operation amount Acc of the accelerator pedal is larger. Namely, the electric control unit 70 has a throttle valve driving means for changing the opening of "the throttle valve 34 disposed in the intake passage of the engine 10" according to the amount (accelerator pedal operation amount Accp) of an accelerating operation performed on the engine 10, which amount is changed by the driver.

(About Shift of Air-fuel Ratio to Lean Side, i.e., Erroneous Lean Correction, due to Selective Diffusion of Hydrogen and Main Feedback Control) The reason (reason for the occurrence of erroneous lean correction) why the air-fuel ratio of the engine shifts to the lean side (a leaner or larger air-fuel ratio), under the feedback control (main feedback control) of the air-fuel ratio based on the output value Vabyfs of the upstream air-fuel ratio sensor 56, when the air-fuel ratio of an imbalance cylinder shifts to a richer or smaller value than that of non-imbalance (or normal) cylinders, will be described in detail. In the following description, the target air-fuel ratio is supposed to be set to the stoichiometric air-fuel ratio, for the sake of convenience.

Fuel supplied to the engine is a compound of carbon and hydrogen. Accordingly, if the air-fuel ratio of an air-fuel mixture to be subjected to combustion is richer than the stoichiometric air-fuel ratio, unburned substances, such as "hydrocarbon HC, carbon monoxide CO and hydrogen $H_2$", are produced as intermediate products. In this case, as the air-fuel ratio of the mixture subjected to combustion, which ratio is richer than the stoichiometric air-fuel ratio, deviates further than the stoichiometric air-fuel ratio, the probability that the intermediate products meet and combine with oxygen during a combustion period is rapidly reduced. As a result, the amount of the unburned substances (HC, CO and $H_2$) rapidly increases (for example, quadratically), as the air-fuel ratio of the mixture supplied to each cylinder becomes richer, as shown in FIG. 2.

Figure 2:
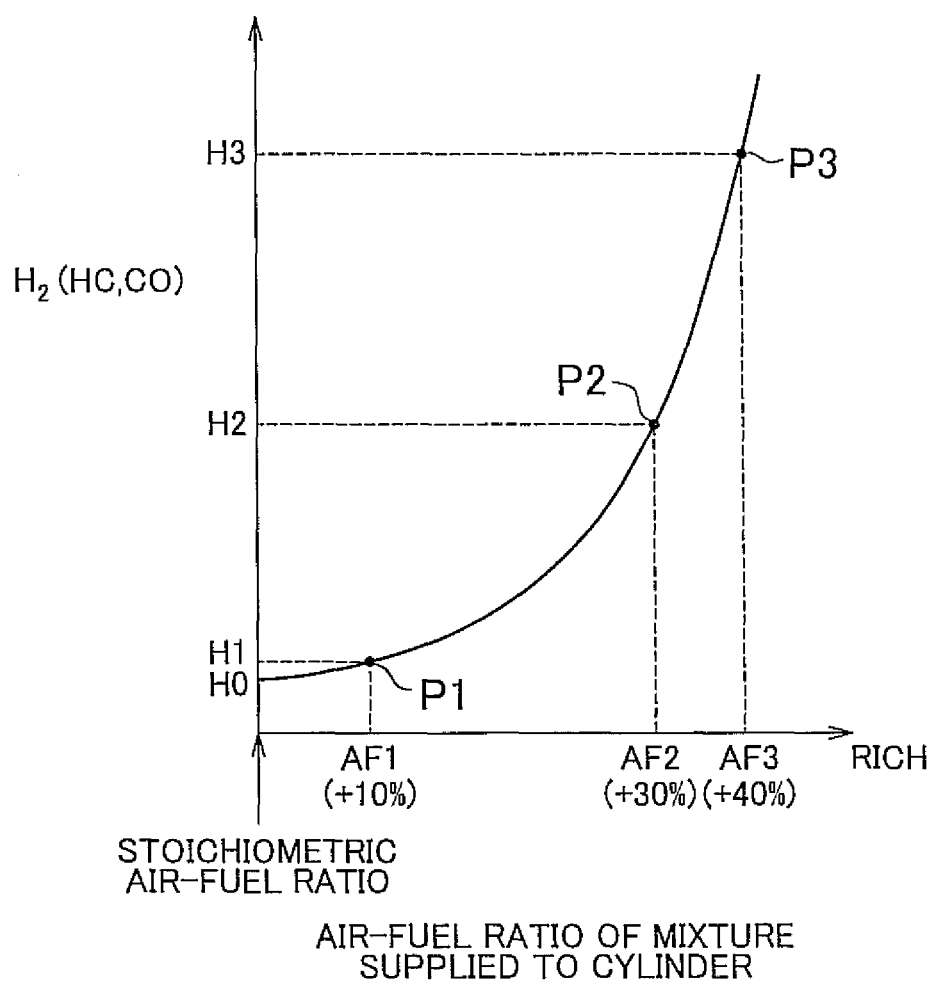
FIG. 2 is a graph indicating the relationship between the air-fuel ratio of an air-fuel mixture supplied to a cylinder, and the amount of unburned components emitted from the cylinder.

Therefore, for example, the total amount SH1 of hydrogen $H_2$ contained in exhaust gas "when an excessive amount of fuel which is larger by 40% than the nominal amount is supplied only to a particular cylinder" is expressed as "SH1=H3+H0+H0+H0=H3+3·H0", according to FIG. 2.

Suppose that the air-fuel ratio A0/F0 is equal to the stoichiometric air-fuel ratio where A0 represents the amount (weight) of air drawn into each cylinder of the engine 10, and F0 represents the amount (weight) of fuel supplied to each cylinder. In this case, the total amount of fuel supplied to the four cylinders (the amount of fuel supplied to the engine as a whole while each cylinder completes one combustion cycle) "when an excessive amount of fuel which is larger by 40% than the nominal amount is supplied only to a particular cylinder" is expressed as 4.4·F0 (=1.4·F0+1·F0+1·F0+1·F0). Accordingly, the true average air-fuel ratio of the engine is "4·A0/(4.4·F0)=A0/(1.1·F0)".

On the other hand, the total amount SH2 of hydrogen $H_2$ contained in exhaust gas "when the amount of fuel supplied to each cylinder is uniformly larger by 10% than the nominal amount" is expressed as "SH2=H1+H1+H1+H1=4·H1", according to FIG. 2. In this case, the total amount of fuel supplied to the engine 10 is expressed as 4.4·F0 (=1.1·F0+1.1·F0+1.1·F0+1.1F0). Accordingly, in this case, the true average air-fuel ratio of the engine is also "4·A0/(4.4·F0)=A0/(1.1·F0)". While the amount H1 is slightly larger than the amount H0, both the amount H1 and the amount H0 are extremely small. Namely, the amount H1 and the amount H0, when compared with the amount H3, may be said to be generally equal to each other. Accordingly, the total amount SH1 of hydrogen is considerably larger than the total amount SH2 of hydrogen (SH1>>SH2).

Thus, even when the true average value of the air-fuel ratios of air-fuel mixtures supplied to the engine 10 as a whole is equal, the total amount SH1 of hydrogen contained in the exhaust gas when an imbalance in the air-fuel ratio among cylinders occurs is significantly larger than the total amount SH2 of hydrogen contained in the exhaust gas when no imbalance in the air-fuel ratio among cylinders occurs.

Accordingly, when only the amount of fuel supplied to the particular cylinder is an excessive amount that is larger by 40% than the nominal amount, the sensed air-fuel ratio abyfs represented by the output value Vabyfs of the upstream air-fuel ratio sensor is richer (smaller) than "the true average value $(A0/(1.1 \cdot F0))$ of the air-fuel ratios of the mixtures supplied to the engine 10 as a whole", because of "selective diffusion of hydrogen $H_2$" in the diffusion resistance layer 564.

Namely, when an imbalance in the air-fuel ratio among cylinders occurs, the concentration of hydrogen $H_2$ at the exhaust-gas-side electrode layer 562 of the upstream air-fuel ratio sensor 56 becomes higher than that of the case where no imbalance in the air-fuel ratio among cylinders occurs, even if the average value of the air-fuel ratio of exhaust gas is equal; therefore, the output value Vabyfs of the upstream air-fuel ratio sensor 56 indicates an air-fuel ratio that is richer than "the true average value of the air-fuel ratio". As a result, the true average of the air-fuel ratios of the mixtures supplied to the engine 10 as a whole is controlled under the main feedback control, to be leaner (larger) than the target air-fuel ratio. The control device makes compensation for the correction to the lean side, thereby to reduce the amount of emissions of nitrogen oxides.

In the case where the air-fuel ratio of an imbalance cylinder shifts to be leaner (larger) than the air-fuel ratio of non-imbalance (or normal) cylinders, too, "shift of the air-fuel ratio to the lean side due to selective diffusion of hydrogen" takes place. This situation occurs, for example, when the fuel injection valve 33 provided for the particular cylinder has an injection characteristic that "it injects fuel in an amount that is noticeably smaller than the designated fuel injection amount".

Suppose that the amount of fuel supplied to a certain particular cylinder (which will be called "first cylinder" for the sake of convenience) is an excessively small amount (i.e., $0.6 \cdot F0$) that is smaller by 40% than the nominal amount, and that the amount of fuel supplied to each of the remaining three cylinders (second, third and fourth cylinders) is equal to the amount (i.e., F0) of fuel which makes the air-fuel ratio of these cylinders equal to the stoichiometric air-fuel ratio. In this case, it is assumed that no misfiring occurs.

In the above case, it is assumed that the amount of fuel supplied to each of the first through fourth cylinders is increased by the same given amount (10%), under the main feedback control. In this case, the amount of fuel supplied to the first cylinder becomes equal to $0.7 \cdot F0$, and the amount of fuel supplied to each of the second through fourth cylinders becomes equal to $1.1 \cdot F0$.

In the above-described condition, the total amount of air supplied to the engine 10 as a four-cylinder engine (i.e., the amount of air supplied to the engine 10 as a whole while each cylinder completes one combustion cycle) is $4 \cdot A0$. Also, the total amount of fuel supplied to the engine 10 (the amount of fuel supplied to the engine 10 as a whole while each cylinder completes one combustion cycle), as a result of the main feedback control, is $4 \cdot F0$ $(=0.7 \cdot F0+1.1 \cdot F0+1.1 \cdot F0+1.1 \cdot F0)$. Accordingly, the true average value of the air-fuel ratios of the mixtures supplied to the engine 10 as a whole becomes equal to "$4 \cdot A0/(4 \cdot F0)=A0/F0$", namely, becomes equal to the stoichiometric air-fuel ratio.

However, in fact, "the total amount SH3 of hydrogen $H_2$ contained in exhaust gas" in this condition is expressed as "SH3=H4+H1+H1+H1=H4+3·H1". H4 is the amount of hydrogen produced when the air-fuel ratio is $A0/(0.7 \cdot F0)$, and is substantially equal to value H0 (the amount of hydrogen produced when the air-fuel ratio is equal to the stoichiometric ratio).

On the other hand, when no imbalance in the air-fuel ratio among cylinders occurs, and the air-fuel ratio of each cylinder is equal to the stoichiometric air-fuel ratio, "the total amount SH4 of hydrogen $H_2$ contained in exhaust gas" is expressed as "SH4=H0+H0+H0+H0=4·H0". It follows that the relationship that "the total amount SH3 (=H4+3·H1)=H0+3·H1 is larger than the total amount SH4 (=4·H0)" is established.

Accordingly, in the case where "the air-fuel ratio of the imbalance cylinder shifts to be leaner than the air-fuel ratio of the non-imbalance cylinders", too, an influence of selective diffusion of hydrogen appears in the output value Vabyfs of the upstream air-fuel ratio sensor 56. Namely, the sensed air-fuel ratio abyfs obtained by applying the output value Vabyfs to the air-fuel ratio conversion table Mapabyfs becomes richer (smaller) than the stoichiometric air-fuel ratio as an upstream-side target air-fuel ratio abyfr. As a result, the main feedback control is further carried out, so that the true average value of the air-fuel ratios of the mixtures supplied to the engine 10 as a whole is corrected to be leaner than the stoichiometric ratio. The control device is configured to make compensation for the correction to the lean side, thereby to reduce the amount of emissions of nitrogen oxides.

(Summary of Fuel Injection Amount Control) Next, the summary of fuel injection amount control executed by the control device of this embodiment will be described. The control device corrects (increases or reduces) the designated fuel injection amount in a feedback manner, so that the sensed air-fuel ratio abyfs represented by the output value Vabyfs of the upstream air-fuel ratio sensor 56 coincides with "a target air-fuel ratio (upstream-side target air-fuel ratio) abyfr". Namely, the control device performs main feedback control.

Also, the control device obtains an air-fuel ratio imbalance index value RIMB that increases as the degree of ununiformity in the air-fuel ratio among the individual cylinders is larger, and increases the designated fuel injection amount Fi so that the amount of the fuel injected increases as the air-fuel ratio imbalance index value RIMB is larger. Namely, the control device performs fuel amount increasing control (fuel amount increasing control for compensating for erroneous lean correction) for increasing/correcting the designated fuel injection amount, so that "the air-fuel ratio (designated air-fuel ratio=Mc/Fi)) determined by the designated fuel injection amount Fi and the in-cylinder intake air amount Mc" becomes "a richer (or smaller) air-fuel ratio" as the air-fuel ratio imbalance index value RIMB is larger.

More specifically, under the fuel amount increasing control for compensating for erroneous lean correction, when the air-fuel ratio imbalance index value RIMB is equal to "0" (namely, when there is no ununiformity (or imbalance) in the air-fuel ratio among the cylinders), the upstream-side target air-fuel ratio abyfr is set to the stoichiometric air-fuel ratio stoich (actually, a value obtained by subtracting a sub-feedback amount KSFB from the stoichiometric air-fuel ratio stoich) as a reference air-fuel ratio. As the air-fuel ratio imbalance index value RIMB becomes larger, the upstream-side target air-fuel ratio abyfr is corrected to a smaller value, within a range smaller than the stoichiometric ratio stoich (actually, the value obtained by subtracting the sub-feedback amount KSFB from the stoichiometric ratio stoich). As a result, the air-fuel ratio of the engine subjected to erroneous lean correction under the main feedback control gets close to the stoichiometric air-fuel ratio.

(Acquisition of Air-fuel Ratio Imbalance Index Value) Next, a method of acquiring an air-fuel ratio imbalance index value adopted by the control device of this embodiment will be described. The air-fuel ratio imbalance index value is a parameter representing "the degree of ununiformity (imbalance) in the air-fuel ratio among the cylinders" caused by changes in characteristics of the fuel injection valves 33, for example.

The control device acquires the air-fuel ratio imbalance index value in the following manner. First, the control device performs a high-pass filtering operation on the output value Vabyfs of the upstream air-fuel ratio sensor 56, so as to obtain a post-high-pass-filtering output value VHPF (the output value VHPF). Actually, the control device subtracts a value (post-low-pass-filtering output value) VLPH obtained by performing a low-pass filtering operation (so-called smoothing operation) on the output value Vabyfs, from the output value Vabyfs, so as to obtain the post-high-pass-filtering output value VHPF, as indicated by Equation (1) below.

$$VHPF = Vabyfs - VLPF \quad (1)$$

Secondly, when a predetermined parameter acquisition condition (air-fuel ratio imbalance index value acquisition condition) is satisfied, the control device obtains "the amount of change of the post-high-pass-filtering output value VHPF per given unit time" each time a predetermined time (a fixed sampling time=first sampling time t1) elapses.

When the unit time is a considerably short time, such as about 4 milliseconds, "the amount of change of the output value VHPF per unit time" may be referred to as a differential value (time differential value $d(VHPF)/dt$, first-order differential value $d(VHPF)/dt$) of the output value VHPF with respect to time. Accordingly, "the amount of change of the output value VHPF per unit time" may also be called "rate of change $\Delta AF$" or "slope $\Delta AF$". Further, the rate of change $\Delta AF$ may also be called "basic index amount (basic index value data)", or "basic parameter".

Thirdly, the control device obtains an average value Ave$\Delta AF$ of absolute values $|\Delta AF|$ of a plurality of change rates $\Delta AF$ obtained over one unit combustion cycle period. The unit combustion cycle period is a period of time it takes for the crankshaft to rotate by a crank angle required for completion of one combustion cycle for each cylinder, in all of the cylinders from which exhaust gases that will reach the single upstream air-fuel ratio sensor 56 are emitted. The engine 10 of this embodiment is an in-line four-cylinder, four-cycle engine, and exhaust gases from the first through fourth cylinders reach the single upstream air-fuel ratio sensor 56. Thus, the unit combustion cycle period is a period it takes for the crankshaft to rotate by a crank angle of 720°.

Fourthly, the control device calculates the average value of the average values Ave$\Delta AF$ obtained with respect to a plurality of unit combustion cycle periods, respectively, and uses the calculated average value as the air-fuel ratio imbalance index value RIMB. However, "the average values Ave$\Delta AF$ as described below" are not used for calculation of the air-fuel ratio imbalance index value RIMB.

(Method 1 of Discarding Data) In each unit combustion cycle period, the control device obtains differential value correlation data $\Delta V$ having "a value corresponding to a time differential value $d(Vabyfs)/dt$ of the output value Vabyfs of the upstream air-fuel ratio sensor 56" each time a given second sampling time t2 elapses. When the ratio (Nm/Np) of "the number Nm of items of data having negative signs, out of the obtained differential value correlation data $\Delta V$" to "the number Np of items of data having positive signs, out of the obtained data $\Delta V$" is equal to or larger than a first threshold value N1$th$, or is equal to or smaller than "a second threshold value N2$th$ that is smaller than the first threshold value N1$th$", the control device does not use the average value Ave$\Delta AF$ obtained in the unit combustion cycle period for calculation of the air-fuel ratio imbalance index value RIMB. Namely, the control device discards "the rates of change $\Delta AF$ (time differential values $d(VHPF)/dt$) as basic index value data" obtained in the unit combustion cycle period.

The first threshold value N1$th$ is set to a predetermined value (e.g., 0.7) that is larger than 0.5. The second threshold value N2$th$ is set to a predetermined value (e.g., 0.3) that is smaller than 0.5. Accordingly, when there is no significant imbalance between the number Np of positive items of data and the number Nm of negative items of data (in other words, when the number Np of positive items of data and the number Nm of negative items of data are substantially equal to each other), the average value Ave$\Delta AF$ based on the basic index value data ($\Delta AF$) obtained in the unit combustion cycle period is used for calculation of the air-fuel ratio imbalance index value RIMB.

While the second sampling time t2 is the same as the first sampling time t1 in this embodiment, the second sampling time t2 may be different from the first sampling time t1 provided that a considerable number of the differential value correlation data $\Delta V$ can be obtained within the shortest time of possible unit combustion cycle periods.

The control device may obtain the ratio (Nm/Np), and determine whether the ratio (Nm/Np) is "equal to or larger than the first threshold value N1$th$, or equal to or smaller than the second threshold value N2$th$". Alternatively, the control device may substantially determine whether the ratio (Nm/Np) is "equal to or larger than the first threshold value N1$th$, or equal to or smaller than the second threshold value N2$th$", by using a value other than the ratio (Nm/Np). For example, the determination may be made based on a ratio (Np/Nm), ratio {Nm/(Np+Nm)}, ratio {Np/(Np+Nm)}, etc. or a value correlated with a difference (Nm−Np).

In addition to the above-described method of discarding data, or in place of the above method of discarding data, the average value Ave$\Delta AF$ may be discarded so as not to be used for calculation of the air-fuel ratio imbalance index value RIMB in the following cases.

(Method 1a of Discarding Data) In each unit combustion cycle period, the control device obtains differential value correlation data $\Delta V$ having a value corresponding to "a time differential value $d(VHPF)/dt$ of the post-high-pass-filtering output value VHPF" each time a given second sampling time t2 elapses. When the ratio (Nm/Np) of "the number Nm of items of data having negative signs, out of the obtained differential value correlation data $\Delta V$" to "the number Np of items of data having positive signs, out of the obtained data $\Delta V$" is equal to or larger than a first threshold value D1$th$, or is equal to or smaller than "a second threshold value D2$th$ that is smaller than the first threshold value D1$th$", the control device does not use the average value Ave$\Delta AF$ obtained in the unit combustion cycle period for calculation of the air-fuel ratio imbalance index value RIMB. Namely, the control device discards "the rates of change ΔAF (time differential values d(VHPF)/dt) as basic index value data" obtained in the unit combustion cycle period.

(Method 1b of Discarding Data) When the post-high-pass-filtering output value VHPF keeps increasing or keeps decreasing over a certain unit combustion cycle period, the control device does not use the average values AveΔAF obtained in the unit combustion cycle period for calculation of the air-fuel ratio imbalance index value RIMB. Namely, the control device discards "the rates of change ΔAF (time differential values d(VHPF)/dt) as basic index value data" obtained in the unit combustion cycle period.

(Method 1c of Discarding Data) When the output value Vabyfs of the upstream air-fuel ratio sensor 56 keeps increasing or keeps decreasing over a certain unit combustion cycle period, the control device does not use the average value AveΔAF obtained in the unit combustion cycle period for calculation of the air-fuel ratio imbalance index value RIMB. Namely, the control device discards "the rates of change ΔAF (time differential values d(VHPF)/dt) as basic index value data" obtained in the unit combustion cycle period.

(Method 2 of Discarding Data) In a certain unit combustion cycle period, the control device obtains a value dG (for example, a time differential value dTA/dt of the throttle opening TA, namely, the rate of change ΔTA of the throttle opening TA) corresponding to a time differential value of "an intake air amount correlation parameter that increases as the intake air amount Ga increases" each time a given third sampling time t3 elapses. When there is "a value dG corresponding to the time differential value" whose magnitude |dG| is equal to or larger than a third threshold value D3*th* in the unit combustion cycle period, the control device does not use the average value AveΔAF obtained in the unit combustion cycle period for calculation of the air-fuel ratio imbalance index value RIMB. Namely, the control device discards "the rates of change ΔAF (time differential values d(VHPF)/dt) as basic index value data" obtained in the unit combustion cycle period.

While the third sampling time t3 is the same as the first sampling time t1 in this embodiment, the third sampling time t3 may be different from the first sampling time t1 provided that a considerable number of "values dG corresponding to the time differential values" can be obtained within the shortest time of possible unit combustion cycle periods.

In other words, when the magnitude of the value dG corresponding to the time differential value of the intake air amount correlation parameter becomes equal to or larger than the third threshold value in a certain unit combustion cycle period, the control device discards "the rates of change ΔAF (time differential values d(VHPF)/dt) as basic index value data" obtained in the unit combustion cycle period.

In this case, the intake air amount correlation parameter may be, for example, the throttle opening TA, the intake air amount Ga, the accelerator pedal operation amount Accp, or the load of the engine (load factor KL).

Figure 12:
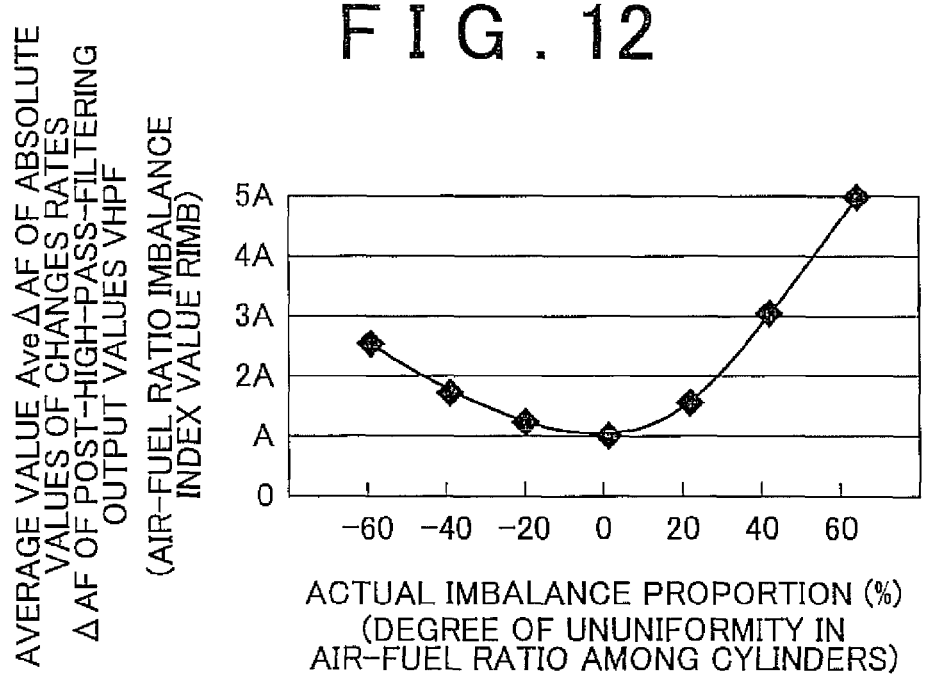
FIG. 12 is a graph relating to the embodiment of the invention, and indicating the relationship between the actual degree of ununiformity in the air-fuel among cylinders (the imbalance proportion) and an air-fuel ratio imbalance index value correlated with the rate of change of the output value of the upstream air-fuel ratio sensor.

As explained above with reference to FIG. 3A to FIG. 3D, the air-fuel ratio imbalance index value RIMB (value correlated with the rate of change ΔAF) obtained as described above increases as "the degree of ununiformity or imbalances in the air-fuel ratio among the cylinders, or cylinder-to-cylinder air-fuel ratio difference" increases. Namely, as shown in FIG. 12, the average value AveΔAF (the air-fuel ratio imbalance index value RIMB) of the absolute values |ΔAF| of the change rates ΔAF over "a plurality of unit combustion cycle periods" increases as the air-fuel ratio of the imbalance cylinder deviates further from the air-fuel ratio of the non-imbalance (or normal) cylinders (as the actual imbalance proportion increases). Namely, the air-fuel ratio imbalance index value RIMB increases as the actual cylinder-to-cylinder air-fuel ratio difference increases (as the degree of ununiformity in the air-fuel ratio among the cylinders increases). It is, however, to be understood that the air-fuel ratio imbalance index value RIMB is not limited to the value obtained in the above manner, but may be obtained by various methods which will be described later.

(Actual Operation) Next, the actual operation of the control device will be described.

Figure 13:
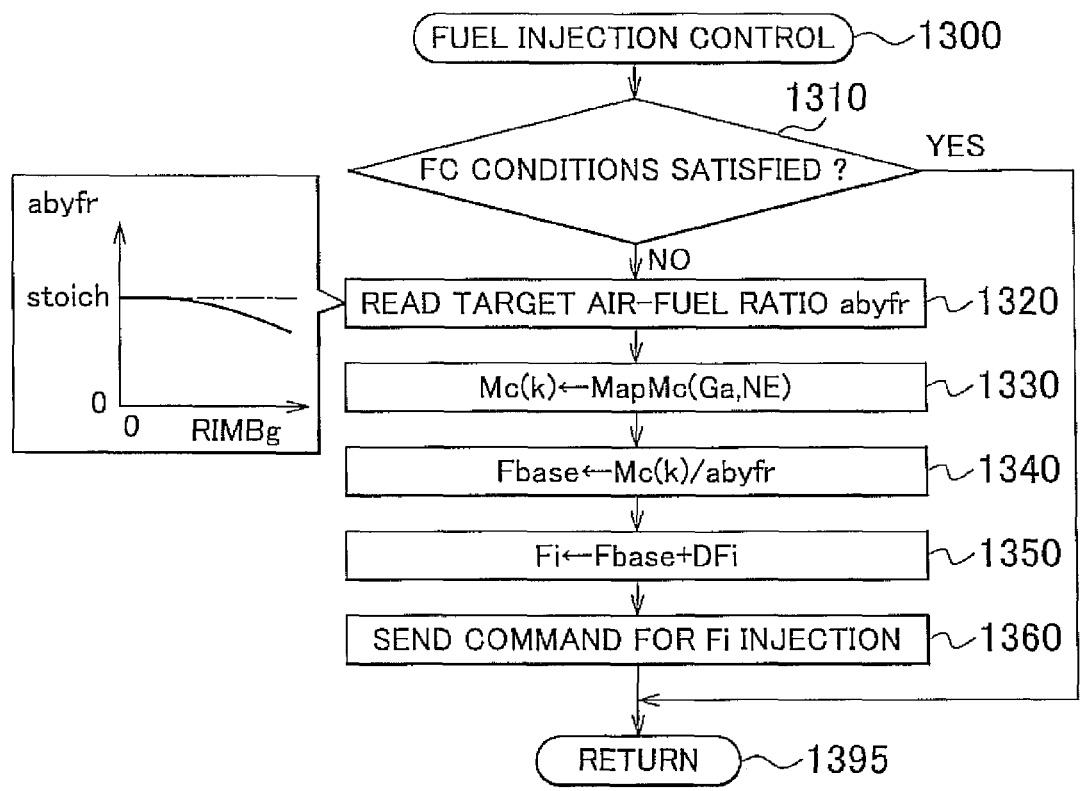
FIG. 13 is a flowchart illustrating a routine executed by CPU of the fuel injection amount control system (the control device) according to the embodiment of the invention.

(Fuel Injection Control) Each time the crank angle of a given cylinder becomes equal to a predetermined crank angle before the top dead center of the suction stroke, the CPU of the control device repeatedly executes a fuel injection control routine as illustrated in FIG. 13, with respect to the given cylinder. The predetermined crank angle is, for example, BTDC90°CA (90° crank angle before the top dead center of the suction stroke). The cylinder whose crank angle is equal to the predetermined crank angle will also be called "fuel injection cylinder". The CPU calculates the designated fuel injection amount Fi and issues a command for fuel injection, by executing the fuel injection control routine.

If the crank angle of a given cylinder coincides with the predetermined crank angle before the top dead center of the suction stroke, the CPU starts processing from step 1300, and determines in step 1310 whether fuel-cut conditions (which will be denoted as "FC conditions") are satisfied.

Suppose that the FC conditions are not satisfied at present. In this case, the CPU makes a negative decision "No" in step 1310, executes step 1320 through step 1360 which will be described below, in the order as indicated in FIG. 13, and proceeds to step 1395 to once finish this routine.

The CPU reads a target air-fuel ratio abyfr determined by a routine of FIG. 17 which will be described later (step 1320). Basically, if a sub-feedback amount KSFB as will be described later is "0", the target air-fuel ratio abyfr is determined so as to be gradually reduced within a range equal to or smaller than the stoichiometric air-fuel ratio as the imbalance index learned value RIMBg increases. The imbalance index learned value RIMBg is separately acquired by the routine of FIG. 16 (FIG. 16A and FIG. 16B) which will be described later.

The CPU obtains "an in-cylinder intake air amount Mc(k)" as "the amount of air drawn into the fuel injection cylinder during a single suction stroke of the fuel injection cylinder", based on "the intake air amount Ga measured by the air flow meter 51, the engine speed NE obtained based on a signal of the crank position sensor 54, and a lookup table MapMc" (step 1330). The in-cylinder intake air amount Mc(k), which is associated with each suction stroke, is stored in the RAM. The in-cylinder intake air amount Mc(k) may be calculated using a known air amount estimation model (a model constructed according to physical laws, which simulates the behavior of air in the intake passage).

The CPU obtains a basic fuel injection amount Fbase, by dividing the in-cylinder intake air amount Mc(k) by the target air-fuel ratio abyfr (step 1340). Thus, the basic fuel injection amount Fbase is a feed-forward amount of the fuel injection amount mathematically required to obtain the target air-fuel ratio abyfr. This step 1340 provides a feed-forward control means (basic fuel injection amount calculation means) for making the air-fuel ratio of an air-fuel mixture supplied to the engine equal to the target air-fuel ratio abyfr.

The CPU corrects the basic fuel injection amount Fbase with a main feedback amount DFi (step 1350). More specifically, the CPU calculates a designated fuel injection amount (final fuel injection amount) Fi, by adding the main feedback amount DFi to the basic fuel injection amount Fbase. The main feedback amount DFi is an air-fuel ratio feedback amount for making the air-fuel ratio of the engine (accordingly, the air-fuel ratio of exhaust gas flowing into the upstream catalyst 43) equal to the target air-fuel ratio abyfr, and is also a feedback amount of air-fuel ratio obtained based on the output value Vabyfs of the upstream air-fuel ratio sensor 56. A method of calculating the main feedback amount DFi will be described later.

The CPU sends an injection command signal for causing "the fuel of the designated fuel injection amount Fi" to be injected from "the fuel injection valve 33 corresponding to the fuel injection cylinder", to the fuel injection valve 33 (step 1360).

As a result, the fuel of the amount mathematically required (the amount supposed to be required) to make the air-fuel ratio of the engine equal to the target air-fuel ratio abyfr is injected from the fuel injection valve 33 of the fuel injection cylinder. Namely, step 1330 through step 1360 provide a designated fuel injection amount control means for controlling the designated fuel injection amount Fi so that "the air-fuel ratio (the air-fuel ratio of exhaust gas flowing into the three-way catalyst 43) of air-fuel mixtures supplied to the combustion chambers 21 of two or more cylinders (all of the cylinders in this embodiment) from which exhaust gases that will reach the upstream air-fuel ratio sensor 56 are emitted" becomes equal to the target air-fuel ratio abyfr.

According to the routine of FIG. 13, the target air-fuel ratio abyfr is reduced as the imbalance index learned value RIMBg is larger; therefore, the basic fuel injection amount Fbase obtained in step 1340 is increased to be larger as the imbalance index learned value RIMBg is larger. Furthermore, the main feedback amount DFi which will be described later is changed so that the sensed air-fuel ratio abyfs coincides with the target air-fuel ratio abyfr. Accordingly, the designated fuel injection amount Fi obtained in step 1350 is increased to be larger as the imbalance index learned value RIMBg is larger. Namely, the routine of FIG. 13 provides a fuel amount increasing means (a fuel amount increasing control means for compensating for erroneous lean correction) for increasing the designated fuel injection amount Fi for correction thereof, so that "the air-fuel ratio (designated air-fuel ratio=Mc(k)/Fi) determined by the designated fuel injection amount Fi" becomes a richer air-fuel ratio (smaller air-fuel ratio) as the acquired imbalance index learned value RIMBg is larger.

If the FC conditions are satisfied at the time when the CPU executes step 1310, the CPU makes an affirmative decision (Yes) in step 1310, and directly proceeds to step 1395 to once finish this routine. In this case, no fuel injection is carried out in step 1360, but fuel cut control (control for stopping fuel supply) is executed.

Figure 14:
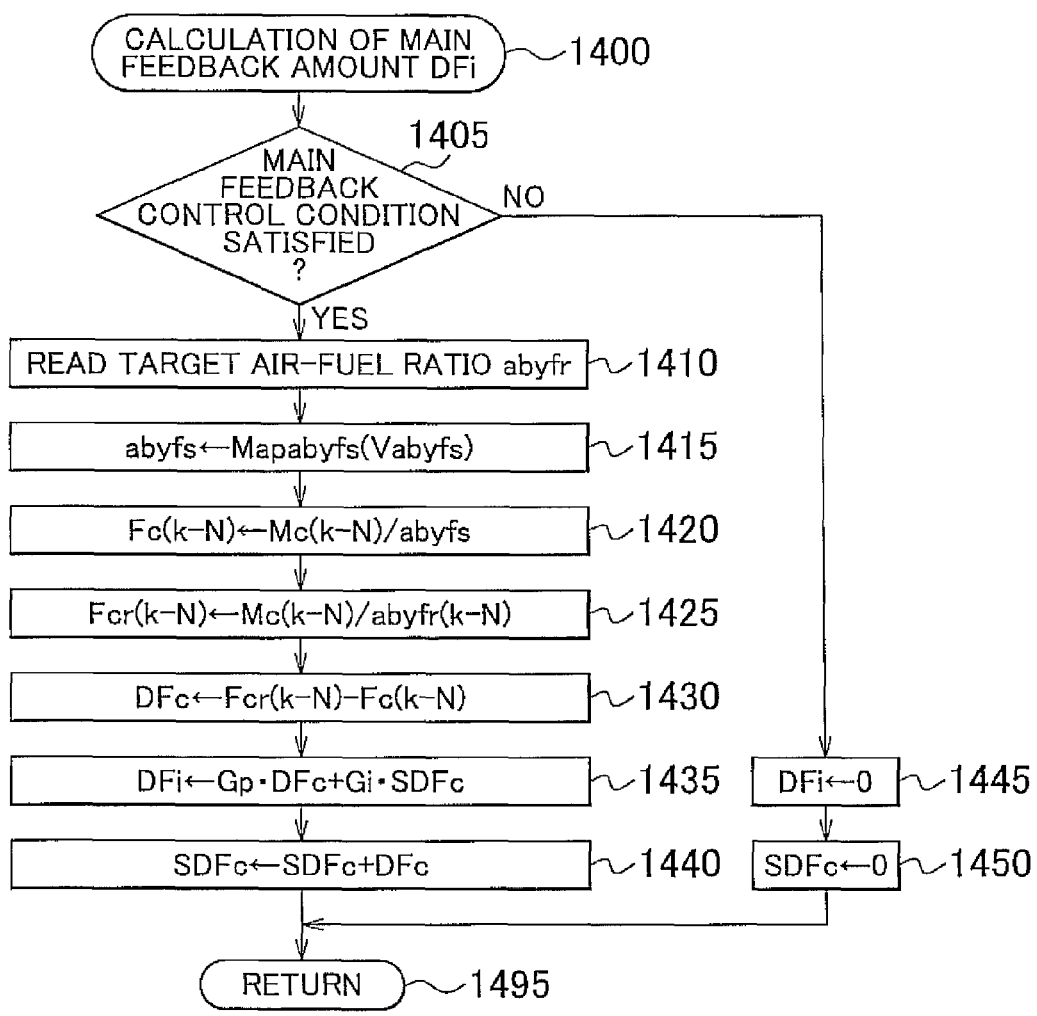
FIG. 14 is a flowchart illustrating a routine executed by the CPU of the control device.

(Calculation of Main Feedback Amount) The CPU repeatedly executes "a main feedback amount calculation routine" illustrated in the flowchart of FIG. 14 upon each lapse of a predetermined time. Each time the predetermined time expires, the CPU starts processing from step 1400, and proceeds to step 1405 to determine whether "a main feedback control condition (upstream air-fuel ratio feedback control condition)" is satisfied.

The main feedback control condition is satisfied when all of the following conditions A1 to A3 are satisfied. The upstream air-fuel ratio sensor 56 has been activated (condition A1). The load KL of the engine is equal to or lower than a threshold value KLth (condition A2). The engine is not under fuel cut control (condition A3).

The above-indicated load KL is a load factor obtained according to Equation (2) below. The accelerator pedal operation amount Accp may be used in place of the load KL. In Eq. (2) below, Mc is the in-cylinder intake air amount, $\rho$ is the air density (in units of (g/l)), L is the amount of emissions of the engine 10 (in units of (l)), and "4" indicates the number of cylinders of the engine 10.

$$KL=(Mc/(\rho \cdot L/4)) \cdot 100\% \quad (2)$$

If the main feedback control condition is satisfied, the CPU makes an affirmative decision (Yes) in step 1405, executes step 1410 through step 1440 which will be described below, in the order as indicated in FIG. 14, and proceeds to step 1495 to once finish this routine.

Figure 17:
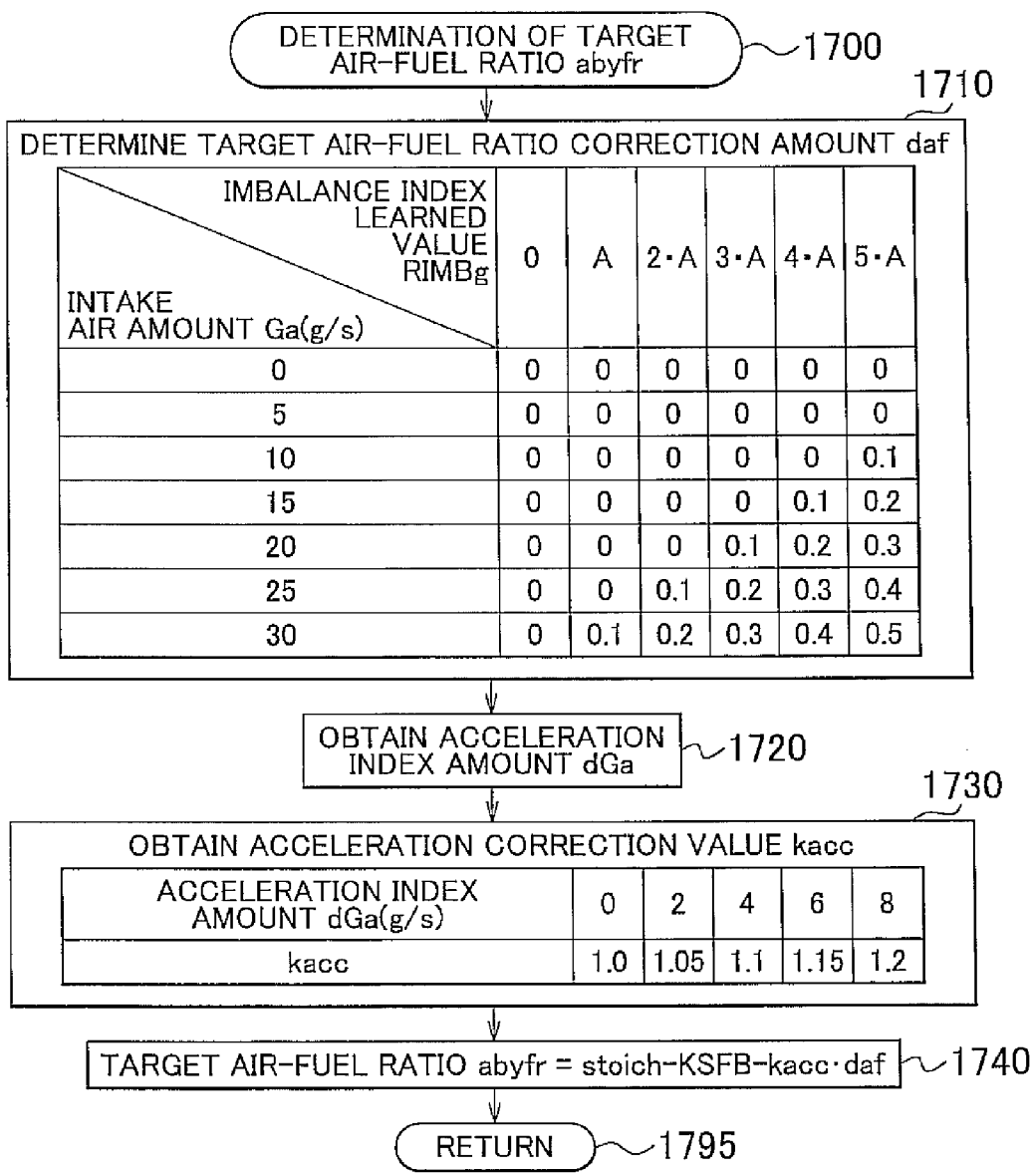
FIG. 17 is a flowchart illustrating a routine executed by the CPU of the control device.

The CPU reads a target air-fuel ratio abyfr(k−N) at the time N cycles prior to the present time that is calculated separately in the routine illustrated in FIG. 17 and that is stored in the RAM (step 1410).

The CPU obtains the sensed air-fuel ratio abyfs, by applying the output value Vabyfs of the upstream air-fuel ratio sensor 56 to the table Mapabyfs indicated in FIG. 10, as indicated in Equation (3) below (step 1415).

$$abyfs=Mapabyfs(Vabyfs) \quad (3)$$

The CPU obtains "an in-cylinder fuel supply amount Fc(k−N)" as "the amount of fuel that was actually supplied to the combustion chamber 21 at the time N cycles prior to the present time", according to Equation (4) below (step 1420). Namely, the CPU obtains the in-cylinder fuel supply amount Fc(k−N), by dividing "the in-cylinder intake air amount Mc(k−N) at the time N cycles (i.e., N·720° crank angle) prior to the present time" by the "sensed air-fuel ratio abyfs".

$$Fc(k-N)=Mc(k-N)/abyfs \quad (4)$$

Thus, the in-cylinder intake air amount Mc(k−N) at the time N cycles prior to the present time is divided by the sensed air-fuel ratio abyfs, so as to obtain the in-cylinder fuel supply amount Fc(k−N), because "a length of time corresponding to N cycles" is required for "the exhaust gas produced by combustion of the air-fuel mixture in the combustion chamber 21" to reach the upstream air-fuel ratio sensor 56.

The CPU obtains "a target in-cylinder fuel supply amount Fcr(k−N)" as "the amount of fuel that should have been supplied to the combustion chamber 21 at the time N cycles prior to the present time", according to Equation (5) below (step 1425). Namely, the CPU obtains the target in-cylinder fuel supply amount Fcr(k−N), by dividing the in-cylinder intake air amount Mc(k−N) at the time N cycles prior to the present time, by the target air-fuel ratio abyfr(k−N) at the time N cycles prior to the present time.

$$Fcr(k-N)=Mc(k-N)/abyfr(k-N) \quad (5)$$

The CPU obtains an in-cylinder fuel supply amount deviation DFc, according to Equation (6) below (step 1430). Namely, the CPU obtains the in-cylinder fuel supply amount deviation DFc, by subtracting the in-cylinder fuel supply amount Fc(k−N) from the target in-cylinder fuel supply amount Fcr(k−N). The in-cylinder fuel supply amount deviation DFc is an amount representing an amount of excess or deficiency of the fuel supplied to the cylinder at the time N strokes prior to the present time.

$$DFc=Fcr(k-N)-Fc(k-N) \quad (6)$$

The CPU obtains the main feedback amount DFi according to Equation (7) below (step 1435). In Eq. (7), Gp is preset proportional gain, and Gi is preset integral gain. Also, "value SDFc" in Eq. (7) is "an integral value of the in-cylinder fuel supply amount deviation DFc". Namely, the CPU calculates "the main feedback amount DFi" according to proportional integral (PI) control for making the sensed air-fuel ratio abyfs equal to the target air-fuel ratio abyfr.

$$DFi = Gp \cdot DFc + Gi \cdot SDFc \qquad (7)$$

The CPU obtains a new integral value SDFc of the in-cylinder fuel supply amount deviation, by adding the in-cylinder fuel supply amount deviation DFc obtained in the above step 1430 to the current integral value SDFc of the in-cylinder fuel supply amount deviation DFc (step 1440).

In the above-described manner, the main feedback amount DFi is calculated by proportional integral control, and the thus obtained main feedback amount DFi is reflected by the designated fuel injection amount Fi in step 1350 of FIG. 13 as described above.

On the other hand, if it is determined in step 1405 of FIG. 14 that the main feedback control condition is not satisfied, the CPU makes a negative decision (No) in step 1405, and proceeds to step 1445 to set the value of the main feedback amount DFi to "0". Then, the CPU stores "0" in the integral value SDFc of the in-cylinder fuel supply amount deviation in step 1450. Thereafter, the CPU proceeds to step 1495 to once finish the routine of FIG. 14. Thus, when the main feedback control condition is not satisfied, the main feedback amount DFi is set to "0". Accordingly, no correction is performed using the main feedback amount DFi of the basic fuel injection amount Fbase.

(Calculation of Sub-feedback amount KSFB and Sub-feedback (FB) Learned Value KSFBg) The CPU repeatedly executes "a routine for calculating a sub-feedback amount KSFB and a sub-feedback learned value KSFBg" illustrated in the flowchart of FIG. 15, upon each lapse of a predetermined time. Each time the predetermined time expires, the CPU starts processing from step 1500, and proceeds to step 1505 to determine whether a sub-feedback control condition is satisfied.

The sub-feedback control condition is satisfied when the following condition B1 and condition B2 are satisfied. The main feedback control condition is satisfied (condition B1). The downstream air-fuel ratio sensor 57 has been activated (condition B2).

If the sub-feedback control condition is satisfied, the CPU makes an affirmative decision (Yes) in step 1505, and executes step 1510 through step 1530 (a sub-feedback amount calculating process) which will be described below. Then, the CPU proceeds to step 1535.

The CPU obtains "an output deviation amount DVoxs" as a difference between "a downstream-side target value Voxsref" and "an output value Voxs of the downstream air-fuel ratio sensor 57", according to Equation (8) below (step 1510). The downstream-side target value Voxsref is set to a value equivalent to a value (e.g., the stoichiometric air-fuel ratio) corresponding to the reference air-fuel ratio abyfr0 within the window of the three-way catalyst 43. Namely, the CPU obtains "the output deviation amount DVoxs" by subtracting "the output value Voxs of the downstream air-fuel ratio sensor 57 at the present time" from "the downstream-side target value Voxsref".

$$DVoxs = Voxsref - Voxs \qquad (8)$$

The CPU obtains a new integral value SDVoxs (=SDVoxs(n)) of the output deviation amount, by adding "the product of the output deviation amount DVoxs obtained in the above step 1510 and gain K" to "the current integral value SDVoxs (=SDVoxs(n−1))", according to Equation (9) below (step 1515). In this embodiment, the gain K is set to "1". The integral value SDVoxs is also called "time integral value SDVoxs or integral processing value SDVoxs".

$$SDVoxs(n) = SDVoxs(n-1) + K \cdot DVoxs \qquad (9)$$

The CPU obtains a new differential value DDVoxs of the output deviation amount, by subtracting "the last output deviation amount DVoxsold as an output deviation amount calculated when the last cycle of this routine was executed" from "the output deviation amount DVoxs calculated in the above step 1510" (step 1520).

The CPU obtains a sub-feedback amount KSFB, according to Equation (10) below (step 1525). In Eq. (10), Kp is a preset proportional gain (proportional constant), Ki is a preset integral gain (integral constant), and Kd is a preset differential gain (differential constant). Namely, Kp·DVoxs is a proportional term, Ki·SDVoxs is an integral term, and Kd·DDVoxs is a differential term. The integral term Ki·SDVoxs is also a steady-state component of the sub-feedback amount KSFB.

$$KSFB = Kp \cdot DVoxs + Ki \cdot SDVoxs + Kd \cdot DDVoxs \qquad (10)$$

The CPU stores "the output deviation amount DVoxs calculated in the above step 1510" as "the last output deviation amount DVoxsold" (step 1530).

Thus, the CPU calculates "the sub-feedback amount KSFB" through the proportional integral and differential (PID) control for making the output value Voxs of the downstream air-fuel ratio sensor 57 equal to the downstream-side target value Voxsref. The sub-feedback amount KSFB is used for calculating the target air-fuel ratio abyfr (abyfr=stoich−KSFB−kacc−daf), as will be described later.

Namely, when the output value Voxs is smaller than the downstream-side target value Voxsref (when the exhaust gas flowing into the downstream air-fuel ratio sensor 57 is fuel-lean), the sub-feedback amount KSFB gradually increases. As the sub-feedback amount KSFB increases, the target air-fuel ratio abyfr is corrected so as to be reduced (to be a richer air-fuel ratio). As a result, the true average air-fuel ratio of the engine 10 is reduced (to be a rich air-fuel ratio), so that the output value Voxs increases to be equal to the downstream-side target value Voxsref.

To the contrary, when the output value Voxs is larger than the downstream-side target value Voxsref (when the exhaust gas flowing into the downstream air-fuel ratio sensor 57 is fuel-rich), the sub-feedback amount KSFB gradually decreases (the sub-feedback amount KSFB includes a negative value). As the sub-feedback amount KSFB decreases, the target air-fuel ratio abyfr is corrected so as to be increased (to be a leaner air-fuel ratio). As a result, the true average air-fuel ratio of the engine 10 is increased (to be a lean air-fuel ratio), so that the output value Voxs is reduced to be equal to the downstream-side target value Voxsref.

The CPU then proceeds to step 1535 to determine whether a learning interval time Tth has elapsed from the time when the learned value (sub-feedback learned value) KSFBg of the sub-feedback amount was updated last time. At this time, if the learning interval time Tth has not elapsed from the last updating of the sub-feedback learned value KSFBg, the CPU makes a negative decision (No) in step 1535, and directly proceeds to step 1595 to once finish the routine of FIG. 15.

On the other hand, if the learning interval time Tth has elapsed from the last updating of the sub-feedback learned value KSFBg, at the time that the CPU executes step 1535, the CPU makes an affirmative decision (Yes) in step 1535, and proceeds to step 1540 to store the product (Ki·SDVoxs) of the current integral value SDVoxs and the integral gain Ki as the sub-feedback learned value KSFBg, in the backup RAM. Then, the CPU proceeds to step 1595 to once finish the routine of FIG. 15.

Thus, the CPU receives the steady-state term Ki·SDVoxs of the sub-feedback amount KSFB at the time of expiration of a longer period (learning interval time Tth) than the period or interval of updating of the sub-feedback amount KSFB, as the sub-feedback learned value KSFBg.

The CPU may acquire a value obtained by subjecting the integral term (steady-state term) Ki·SDVoxs to a low-pass filtering operation, as the sub-feedback learned value KSFBg. Also, the CPU may acquire a value obtained by subjecting the sub-feedback amount KSFB to a low-pass filtering operation, as the sub-feedback learned value KSFBg. Namely, the sub-feedback learned value KSFBg may be any value provided that it corresponds to a steady component of the sub-feedback amount KSFB.

On the other hand, if the sub-feedback control condition is not satisfied when the CPU executes step 1505, the CPU makes a negative decision (No) in step 1505, and proceeds to step 1545 to set the sub-feedback learned value KSFBg as the sub-feedback amount KSFB. Namely, the CPU stops updating of the sub-feedback amount KSFB. Then, the CPU proceeds to step 1550, and stores a value (sub-feedback learned value KSFBG/integral gain Ki) obtained by dividing the sub-feedback learned value KSFBg by the integral gain Ki, as an integral value SDVoxs, in the backup RAM. Then, the CPU proceeds to step 1595 to once finish the routine of FIG. 15.

The output value Voxs of the downstream air-fuel ratio sensor 57 reflects the true average air-fuel ratio of the engine 10 (accordingly, "the air-fuel ratio corrected excessively to the lean side" due to the main feedback control). This is because a large amount of hydrogen produced when an imbalance in the air-fuel ratio among cylinders occurs is converted and removed at the upstream catalyst 43. Accordingly, through the sub-feedback control using the sub-feedback amount for making the output value Voxs equal to the downstream-side target value Voxsref, the true average air-fuel ratio of the engine 10 is corrected to be equal to "a value (e.g., the stoichiometric air-fuel ratio) corresponding to the reference air-fuel ratio abyfr0 within the window of the three-way catalyst 43". Accordingly, if the sub-feedback amount is controlled to an appropriate value, a large amount of NOx is prevented from being emitted from the engine.

However, the sub-feedback control is performed so as to gradually change "the average of the air-fuel ratio of the engine". Therefore, in general, the sub-feedback amount KSFB is updated so as to slowly change the target air-fuel ratio abyfr. Accordingly, a period over which the sub-feedback amount is not controlled to an appropriate value appears, for example, after starting of the engine. In addition, the degree of "erroneous lean correction" varies depending on operating conditions of the engine 10, even where the degree of ununiformity in the air-fuel ratio among cylinders is "a certain specified value". For example, the degree of erroneous lean correction increases as the intake air amount Ga increases.

Accordingly, when there is an imbalance in the air-fuel ratio among cylinders, and the engine is in transient operation, for example, after the engine is started, or when rapid changes (in particular, increases) in the intake air amount occur, the period over which the sub-feedback amount is an inappropriate value is prolonged, and the true average air-fuel ratio of the engine 10 may not be corrected to the reference air-fuel ratio abyfr0.

On the other hand, the control device executes fuel amount increasing control for compensating for erroneous lean correction, by changing the target air-fuel ratio abyfr based on the imbalance index learned value RIMBg. Accordingly, the true average air-fuel ratio of the engine 10 can be made equal to the reference air-fuel ratio abyfr0.

The control device may be arranged not to execute the sub-feedback control using the sub-feedback amount. In this case, the routine of FIG. 15 is omitted. Also, "0" is substituted into the sub-feedback amount KSFB used in other routines.

(Acquisition of Air-fuel Ratio Imbalance Index Value RIMB) Next, a process for acquiring an air-fuel ratio imbalance index value RIMB will be described. The CPU executes a routine illustrated in the flowchart of FIG. 16A and FIG. 16B, each time 4 ms ("a given first sampling time t1" as the above-mentioned unit time) elapses.

Each time the given sampling time (ts) expires, the CPU starts processing from step 1600, and proceeds to step 1605 to determine whether a value of a parameter acquisition permission flag Xkyoka is "1".

The value of the parameter acquisition permission flag Xkyoka is set to "1" when a parameter acquisition condition (air-fuel ratio imbalance index value acquisition permission condition) which will be described later is satisfied at the time when the absolute crank angle CA is equal to 0°, and is immediately set to "0" at the time when the parameter acquisition condition fails to be satisfied.

The parameter acquisition condition is satisfied when all of the following condition C1 through condition C5 are satisfied. Accordingly, the parameter acquisition condition is not satisfied if at least one of the following conditions (condition C1 through condition C5) is not satisfied. Needless to say, the conditions that constitute the parameter acquisition condition are not limited to the condition C1 through condition C5 below.

The intake air amount Ga obtained by the air flow meter 51 is within a predetermined range (condition C1). Namely, the intake air amount Ga is equal to or larger than a lower threshold value GaLoth of the air flow rate, and is equal to or smaller than a higher threshold value GaHith of the air flow rate. The engine speed NE is within a predetermined range (condition C2). Namely, the engine speed NE is equal to or higher than a lower threshold value of the engine speed, and is equal to or lower than a higher threshold value of the engine speed. The coolant temperature THW is equal to or higher than a threshold value THWth of the coolant temperature (condition C3). The main feedback control condition is satisfied (condition C4). The engine is not under fuel cut control (condition C5).

Suppose that the value of the parameter acquisition permission flag Xkyoka is "1". In this case, the CPU makes an affirmative decision (Yes) in step 1605, and proceeds to step 1635 after executing step 1610 through step 1630 as described below, in the order as indicated in FIG. 16.

The CPU obtains "the current output value Vabyfs of the upstream air-fuel ratio sensor 56" (step 1610). Before executing step 1610, the CPU stores the output value Vabyfs obtained during execution of the last cycle of this routine, as the last output value Vabyfsold. Namely, the last output value Vabyfsold is an output value Vabyfs obtained 4 ms (first sampling time t1) prior to the present time. The initial value of the output value Vabyfs is set to a value corresponding to the stoichiometric air-fuel ratio in an initial routine. The initial routine is executed by the CPU when the ignition key switch of the vehicle on which the engine 10 is installed is turned from OFF to ON.

The CPU calculates a post-low-pass-filtering output value VLPF by performing a low-pass filtering operation on the output value Vabyfs of the upstream air-fuel ratio sensor 56, according to Equation (11) below (step 1615). In Eq. (11), VLPF(n) on the left-hand side denotes "a post-low-pass-filtering output value VLPF after updating", and VLPF(n−1) on the right-hand side denotes "a post-low-pass-filtering output value VLPF before updating". Vabyfs on the right-hand side denotes an output value Vabyfs newly obtained in step 1610 of FIG. 16A, and "a" on the right-hand side is a weight that is larger than 0 and smaller than 1.

$$VLPF(n)=a\cdot VLPF(n-1)+(1-a)\cdot Vabyfs \quad (11)$$

The CPU calculates a post-high-pass-filtering output value VHPF according to the above-indicated Equation (11) (step 1620). Namely, the CPU calculates the post-high-pass-filtering output value VHPF by subtracting the post-low-pass-filtering output value VLPF from the output value Vabyfs. Accordingly, step 1610 to step 1620 constitute a high-pass filtering means for performing a high-pass filtering operation on the output value Vabyfs. The CPU may accomplish a high-pass filtering operation by performing a known digital high-pass filtering operation on the output value Vabyfs. Before executing step 1620, the CPU stores "the output value VHPF obtained during execution of the last cycle of this routine" as the last output value VHPFold.

The CPU obtains a rate of change ΔAF (a differential value d(VHPF)/dt) of the output value Vabyfs, updates an integrated value SAFD of absolute values |ΔAF| of the change rates ΔAF, and updates a cumulative number counter Cn for counting the number of times the absolute value |ΔAF| of the change rate ΔAF is accumulated on the integrated value SAFD (step 1625). In the following, these updating methods will be specifically described.

(Acquisition of Rate of Change ΔAF) The rate of change ΔAF (differential value d(VHPF)/dt) of the post-high-pass-filtering output value VHPF is data (basic index value data, basic parameter) that provides original data for the air-fuel ratio imbalance index value RIMB. The CPU obtains the rate of change ΔAF, by subtracting the output value VHPFold of the last cycle from the output value VHPF of the current cycle. Namely, where the output value VHPF of the current cycle is denoted as VHPF(n), and the output value VHPFold of the last cycle is denoted as VHPF(n−1), the CPU determines "the rate of change ΔAF(n) of the current cycle" in step 1625, according to Equation (12) as follows.

$$\Delta AF(n)=VHPF(n)-VHPF(n-1) \quad (12)$$

(Updating of Integrated Value SAFD of Absolute Values |ΔAF| of Change Rates ΔAF) The CPU obtains the integrated value SAFD(n) of this cycle, according to Equation (13) below. Namely, the CPU updates the integrated value SAFD by adding the absolute value |ΔAF(n)| of the calculated change rate ΔAF of this cycle, to the last integrated value SAFD(n−1) as of the time when the CPU proceeds to step 1625.

$$SAFD(n)=SAFD(n-1)+|\Delta AF(n)| \quad (13)$$

Figure 3A:
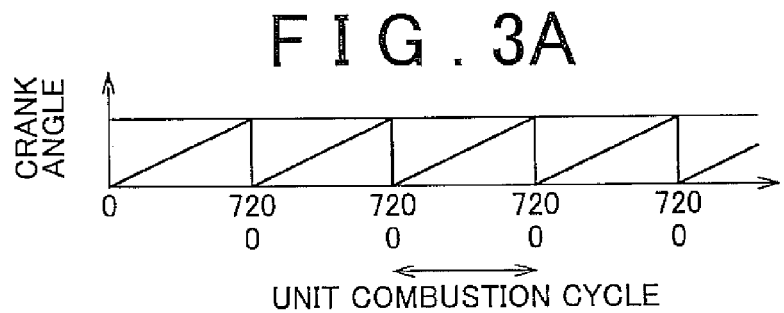
FIG. 3A to FIG. 3D are time charts showing "the behavior of each value related to the air-fuel ratio imbalance index value" in the case where an air-fuel ratio imbalance condition among cylinders occurs (the degree of ununiformity in the air-fuel ratio among cylinder is large) and the case where no air-fuel ratio imbalance condition among cylinders occurs (there is no ununiformity in the air-fuel ratio among cylinders)
Figure 3B:
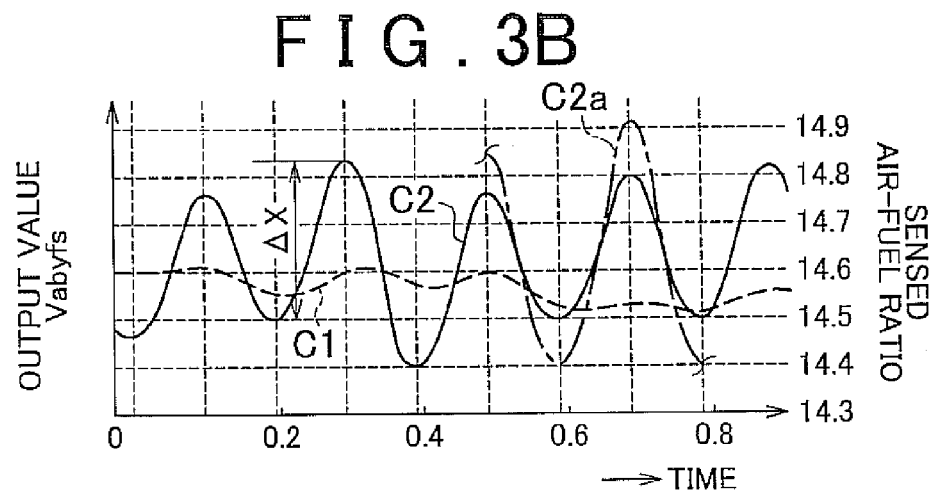
Figure 3C:
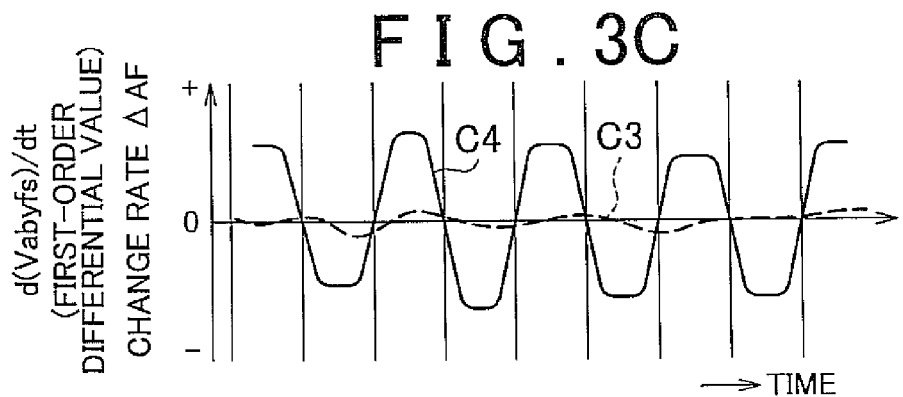
Figure 3D:
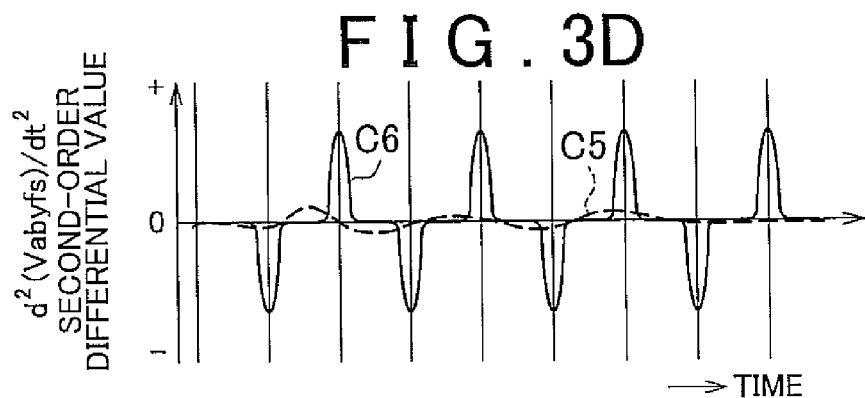

"The absolute value |ΔAF(n)| of the change rate ΔAF(n) of this cycle" is added to the integrated value SAFD, because the rate of change ΔAF(n) may be a positive value or a negative value, as is understood from FIG. 3B and FIG. 3C. The integrated value SAFD is also set to "0" in the above-described initial routine.

(Updating of Cumulative Number Counter Cn for Counting the Number of Times Absolute Value |ΔAF| of Change Rate ΔAF is Accumulated on Integrated Value SAFD) The CPU increases the value of the counter Cn by "1", according to Equation (14) below. Cn(n) is a counter value after updating, and Cn(n−1) is a counter value before updating. The value of the counter Cn is set to "0" in the above-described initial routine, and is also set to "0" in step 1660, step 1670 and step 1675 which will be described later. Thus, the value of the counter Cn indicates the number of items of data representative of the absolute value |ΔAF| of the change rate ΔAF, which have been integrated or accumulated to provide the integrated value SAFD.

$$Cn(n)=Cn(n-1)+1 \quad (14)$$

The CPU obtains differential value correlation data ΔV having a value corresponding to a time differential value d(Vabyfs)/dt of the output value Vabyfs of the upstream air-fuel ratio sensor 56 (step 1630). The differential value correlation data ΔV is obtained by subtracting the output value Vabyfsold obtained the first sampling time t1 (second sampling time t2) prior to the present time, from the current output value Vabyfs. Furthermore, the CPU increases a counter Np indicative of the number of items of positive data by "1" (increments the counter Np) if the sign of the differential value correlation data ΔV is positive (namely, ΔV>0). Also, the CPU increases a counter Nm indicative of the number of items of negative data by "1" (increments the counter Nm) if the sign of the differential value correlation data ΔV is negative (namely, ΔV<0).

The value of the counter Np and the value of the counter Nm are set to "0" in the above-described initial routine, and are also set to "0" in step 1660, step 1670 and step 1675 which will be described later. Accordingly, the value of the counter Np represents the number of items of data having positive signs, out of the differential value correlation data ΔV obtained in the unit combustion cycle in which the present time falls. The value of the counter Nm represents the number of items of data having negative signs, out of the differential value correlation data ΔV obtained in the unit combustion cycle in which the present time falls.

Furthermore, the CPU obtains "a rate of change ΔTA of the throttle opening TA" as a time differential value dTA/dt of the throttle opening TA, and stores the rate of change ΔTA in RAM. The rate of change ΔTA is obtained by subtracting the throttle opening TAold obtained the first sampling time t1 (third sampling time t3) prior to the present time, from the current throttle opening TA.

Then, the CPU proceeds to step 1635 to determine whether the crank angle CA (absolute crank angle CA) relative to the compression top dead center of the reference cylinder (the first cylinder in this embodiment) is equal to 720° crank angle. In this step, if the absolute crank angle CA is smaller than 720°, the CPU makes a negative decision (No) in step 1635, and directly proceeds to step 1695 to once finish the routine of FIG. 16A and FIG. 16B.

Step 1635 is provided for defining the minimum unit period for obtaining the average value of the absolute values |ΔAF| of the change rates ΔAF. In this embodiment, "720° crank angle as a unit combustion cycle period" corresponds to the minimum period. Further, it is desirable that the minimum period is obtained by multiplying the unit combustion cycle period by a natural number or positive integer.

If, on the other hand, the absolute crank angle CA is equal to 720° crank angle when the CPU executes step 1635, the CPU makes an affirmative decision (Yes) in step 1635, and proceeds to step 1640.

The CPU determines in step 1640 whether the ratio (Nm/Np) of "the number Nm of items of data having negative signs, out of the obtained differential value correlation data ΔV" to "the number Np of items of data having positive signs, out of the obtained data ΔV" is larger than the second threshold value D2*th* and smaller than the first threshold value D1*th*.

If the ratio (Nm/Np) is equal to or larger than the first threshold value D1*th*, or is equal to or smaller than "the second threshold value D2*th* that is smaller than the first threshold value D1*th*", the CPU proceeds to step 1670, and sets (clears) "each value (ΔAF, SAFD, Cn, Np, Nm, ΔTA, etc.) used for calculating the average value AveΔAF with respect to the unit combustion cycle period immediately before execution of this step (which will be called "the last unit combustion cycle period)" to "0". Then, the CPU proceeds to step 1695 to once finish the routine of FIG. 16. As a result, if the ratio (Nm/Np) is equal to or larger than the first threshold value D1*th*, or smaller than "the second threshold value D2*th* that is smaller than the first threshold value D1*th*", the basic index value data (the rate of change ΔAF) obtained in the last unit combustion cycle period is discarded, and is not used for calculation of the air-fuel ratio imbalance index value RIMB.

On the other hand, if the ratio (Nm/Np) is "larger than the second threshold value D2*th* and smaller than the first threshold value D1*th*" at the time when the CPU executes step 1640, the CPU makes an affirmative decision (Yes) in step 1640, and proceeds to step 1645.

The CPU determines in step 1645 whether there is a rate of change ΔTA whose magnitude (|ΔTA|) is equal to or larger than the third threshold value D3*th*, among a plurality of "rates of change ΔTA of the throttle opening TA" obtained in the last unit combustion cycle period. More specifically, the CPU selects the maximum value ZTAmax from the absolute values |ΔTA| of the plurality of change rates ΔTA, and determines whether the maximum value ZTAmax is smaller than the third threshold value D3*th*. In this connection, the rate of change ΔTA of the throttle opening TA is "a value corresponding to a time differential value of the intake air amount correlation parameter that increases as the intake air amount Ga increases".

If the maximum value ZTAmax is equal to or larger than the third threshold value D3*th*, the CPU makes a negative decision (No) in step 1645, and proceeds to step 1670 to set (clear) each value (ΔAF, SAFD, Cn, Np, Nm, ΔTA, etc.) to "0". Then, the CPU proceeds to step 1695 to once finish the routine of FIG. 16. As a result, if the maximum value ZTAmax is equal to or larger than the third threshold value D3*th*, the basic index value data (the change rates ΔAF) obtained in the last unit combustion cycle period is discarded, and is not used for calculation of the air-fuel ratio imbalance index value RIMB.

On the other hand, if the maximum value ZTAmax is smaller than the third threshold value D3*th* at the time when the CPU executes step 1645, the CPU makes an affirmative decision (Yes) in step 1645, and proceeds to step 1650.

In step 1650, the CPU calculates the average value AveΔAF of the absolute values |ΔAF| of the change rates ΔAF, updates the integrated value Save of the average values AveΔAF, and updates a cumulative number counter Cs. In the following, these updating methods will be specifically described.

(Calculation of Average Value AveΔAF of Absolute Values |ΔAF| of Change Rates ΔAF) The CPU calculates the average value AveΔAF of the absolute values |ΔAF| of the change rates ΔAF, by dividing the integrated value SAFD by the value of the counter Cn, as indicated in Equation (15) below. Then, the CPU sets the integrated value SAFD and the value of the counter Cn to "0".

$$Ave\Delta AF = SAFD/Cn \tag{15}$$

(Updating of Integrated Value Save of Average Values AveΔAF) The CPU obtains the integrated value Save(n) of this cycle, according to Equation (16) below. Namely, the CPU updates the integrated value Save, by adding the calculated average value AveΔAF of this cycle to the integrated value Save(n−1) of the last cycle as of the time when the CPU proceeds to step 1650. The value of the integrated value Save(n) is set to "0" in the initial routine as described above, and is also set to "0" in step 1660 which will be described later.

$$Save(n) = Save(n-1) + Ave\Delta AF \tag{16}$$

(Updating of Cumulative Number Counter Cs) The CPU increases the value of the counter Cs by "1", according to Equation (17) below. Cs(n) denotes a value of the counter Cs after updating, and Cs(n−1) denotes a value of the counter Cs before updating. The value of the counter Cs is set to "0" in the initial routine as described above, and is also set to "0" in step 1660 which will be described later. Accordingly, the value of the counter Cs represents the number of items of data indicative of the average value AveΔAF, which have been integrated or accumulated into the integrated value Save.

$$Cs(n) = Cs(n-1) + 1 \tag{17}$$

Then, the CPU proceeds to step 1655, and determines whether the value of the counter Cs is equal to or larger than a threshold value Csth. If the value of the counter Cs is smaller than the threshold value Csth at this time, the CPU makes a negative decision (No) in step 1655, and directly proceeds to step 1695 to once finish the routine of FIG. 16A and FIG. 16B. The threshold value Csth is a natural number, and is desirably equal to 2 or larger.

On the other hand, if the value of the counter Cs is equal to or larger than the threshold value Csth at the time when the CPU executes step 1655, the CPU makes an affirmative decision (Yes) in step 1655, and proceeds to step 1660. The CPU acquires an air-fuel ratio imbalance index value RIMB in step 1660, by dividing the integrated value Save by the value (=Csth) of the counter Cs according to Equation (18) below. The air-fuel ratio imbalance index value RIMB is obtained by averaging the average value AveΔAF of the absolute values |ΔAF| of the change rates ΔAF (differential values d(VHPF)/dt) obtained in each unit combustion cycle period, with respect to the plurality of (Csth pieces of) unit combustion cycle periods. The air-fuel ratio imbalance index value RIMB is an air-fuel ratio fluctuation index amount AFD that increases as fluctuations in the post-high-pass-filtering output value VHPF (with time) increases.

$$RIMB = Save/Csth \tag{18}$$

The CPU sets (clears) each value (ΔAF, SAFD, Cn, ΔV, Np, Nm, AveΔAF, Save, Cs, etc.) used for calculating the air-fuel ratio imbalance index value RIMB to "0" in step 1660.

Then, the CPU proceeds to step 1665 to calculate a post-filtering imbalance index value RIMBg, by performing "a smoothing operation" as a first-order lag filtering operation (low-pass filtering) on the air-fuel ratio imbalance index value RIMB, according to Equation (19) below, and store the post-filtering imbalance index value RIMBg in backup RAM as an imbalance index learned value RIMBg. In Eq. (19), RIMBg on the left-hand side denotes "an imbalance index learned value RIMBg after updating (the current value of the imbalance index learned value RIMBg)", and RIMBg on the right-hand side denotes "an imbalance index learned value RIMBg before updating (namely, the last value of the imbalance index learned value RIMBg available immediately before the CPU proceeds to step 1665)". RIMB on the right-hand side denotes the latest air-fuel ratio imbalance index value RIMB newly obtained in step 1660 (the current value of the air-fuel ratio imbalance index value RIMB). α is a weight that is larger than 0 and smaller than 1.

$$RIMBg=\alpha \cdot RIMBg+(1-\alpha)\cdot RIMB \quad (19)$$

In step 1665, the CPU may store the air-fuel ratio imbalance index value RIMB as it is in the backup RAM, as an imbalance index learned value RIMBg. In any event, the imbalance index learned value RIMBg is a value correlated with the air-fuel ratio imbalance index value RIMB.

When there is no ununiformity or imbalances in the air-fuel ratio among the cylinders (namely, when the air-fuel ratios of all of the cylinders are equal), the rate of change ΔAF is equal to "0", and therefore, the air-fuel ratio imbalance index value RIMB obtained in the manner as described above becomes equal to the reference value "0". Accordingly, when the engine is kept in a condition where there is no ununiformity or imbalances in the air-fuel ratio among the cylinders, the imbalance index learned value RIMBg is also kept equal to the reference value "0".

If the value of the parameter acquisition permission flag Xkyoka is not equal to "1" when the CPU proceeds to step 1605, the CPU makes a negative decision (No) in step 1605, and proceeds to step 1675. In step 1675, the CPU sets (clears) "respective values (ΔAF, SAFD, Cn, etc.) used for calculating the average value AveΔAF" to "0". Then, the CPU proceeds to step 1695, and once finishes the routine of FIG. 16A and FIG. 16B.

(Determination of Target Air-fuel Ratio abyfr) Next, a process for determining the target air-fuel ratio abyfr will be described. The CPU repeatedly executes "a target air-fuel ratio determining routine" illustrated in the flowchart of FIG. 17 each time a predetermined time elapses. Each time the predetermined time expires, the CPU starts processing from step 1700, and proceeds to step 1710 to determine a target air-fuel ratio correction amount daf, based on "the imbalance index learned value RIMBg h and the intake air amount Ga". The target air-fuel ratio correction amount daf is obtained according to a target air-fuel ratio correction amount table Mapdaf (RIMBg, Ga) provided in the block of step 1710 of FIG. 17.

According to the target air-fuel ratio correction amount table Mapdaf (RIMBg, Ga), the target air-fuel ratio correction amount daf is determined as follows. The target air-fuel ratio correction amount daf increases as the intake air amount Ga increases. The target air-fuel ratio correction amount daf increases as the imbalance index learned value RIMBg increases.

Then, the CPU proceeds to step 1720, and obtains an acceleration index amount dGa indicative of the degree of acceleration of the engine 10. More specifically, the CPU obtains an amount of change of the intake air amount Ga per unit time, as an acceleration index amount dGa, by subtracting a previous intake air amount Gaold obtained a given time (e.g., 16 ms) prior to the present time, from the current intake air amount Ga. The acceleration index amount dGa may also be any one of the amount of change dTA of the throttle opening TA per unit time, the amount of change dKL of the load KL per unit time, and the amount of change dAccp of the accelerator pedal operation amount Accp per unit time.

Then, the CPU proceeds to step 1730 to obtain an acceleration correction value kacc based on the acceleration index amount dGa. Namely, the CPU obtains the acceleration correction value kacc according to an acceleration correction value table Mapkacc (dGa) provided in the block of step 1730 of FIG. 17. According to the acceleration correction value table Mapkacc (dGa), the acceleration correction value kacc is determined so as to "gradually increase within a range larger than 1" as the acceleration index amount dGa increases.

Then, the CPU proceeds to step 1740 to determine the target air-fuel ratio abyfr, according to Equation (20) below. Namely, the CPU obtains the target air-fuel ratio abyfr, by subtracting the sub-feedback amount KSFB, and further subtracting "the product of the acceleration correction value kacc and the target air-fuel ratio correction amount daf", from the stoichiometric air-fuel ratio stoich. Then, the CPU proceeds to step 1795 to once finish the routine of FIG. 18. The CPU may always set the acceleration correction value kacc to "1". Namely, the CPU may determine the target air-fuel ratio abyfr by subtracting the target air-fuel ratio correction amount daf from (stoichi−KSFB), without obtaining the acceleration index amount dGa.

$$abyfr=stoich-KSFB-kacc-daf \quad (20)$$

As a result, the target air-fuel ratio abyfr is reduced (i.e., set to a richer air-fuel ratio) so that the absolute value of a difference between the target air-fuel ratio abyfr and the stoichiometric air-fuel ratio stoich (actually, stoich−KSFB) is increased, as the imbalance index learned value RIMBg (air-fuel ratio imbalance index value RIMB) increases, the intake air amount Ga increases, and/or the acceleration index amount dGa increases.

Accordingly, the designated fuel injection amount Fi is corrected so as to increase as the imbalance index learned value RIMBg increases, and also increase, as the intake air amount Ga increases, by an amount further larger than an amount commensurate with the increase of the intake air amount Ga (i.e., an amount of increase of the designated fuel injection amount Fi that increases based on the increase of the intake air amount Ga when the target air-fuel ratio abyfr is constant). Furthermore, the designated fuel injection amount Fi is corrected so as to increase as the acceleration index amount dGa increases.

Consequently, the designated fuel injection amount Fi is controlled depending on the intake air amount Ga, the degree of ununiformity (imbalance) in the air-fuel ratio among cylinders, an accelerating condition, and so forth, so that the designated fuel injection amount Fi and the designated air-fuel ratio become an appropriate value. Accordingly, the amount of emissions of nitrogen oxides and unburned substances can be reduced even in the case where the degree of ununiformity in the air-fuel ratio among cylinders is large.

As is apparent from the target air-fuel ratio correction amount table Mapdaf (RIMBg, Ga) provided in the block of step 1710 of FIG. 17, the target air-fuel ratio abyfr is changed to a smaller value than the stoichiometric air-fuel ratio stoich (actually, stoich−KSFB), only when operation conditions defined by the intake air amount Ga and the imbalance index learned value RIMBg are specific operating conditions. Namely, the designated air-fuel ratio is corrected to a richer air-fuel ratio, in an operating region (large intake air amount region and high imbalance proportion condition) of the target air-fuel ratio correction amount table Mapdaf (RIMBg, Ga) in which numerical values other than "0" are entered. In other words, "when the intake air amount Ga is larger than a threshold value Gavth of the intake air amount which is smaller as the imbalance index learned value RIMBg is larger", the designated fuel injection amount Fi is corrected to be increased. Accordingly, the amount of emissions of nitrogen oxides and unburned substances can be reduced, without performing wasteful correction to increase the designated fuel injection amount Fi.

As explained above, the control device is concerned with a fuel injection amount control device of an internal combustion engine including a designated fuel injection amount determining means (see step 1320 through step 1350 of FIG. 13, FIG. 14, etc.) for determining a designated value of the amount of fuel injected from each of the plurality of fuel injection valves 33 (a designated fuel injection amount Fi), by feedback-correcting the amount of fuel injected from the fuel injection valve 33 based on "the output value of the upstream air-fuel ratio sensor 56" so that the air-fuel ratio of exhaust gas flowing into the three-way catalyst 43 coincides with the target air-fuel ratio, and an injection command signal sending means (see step 1360 of FIG. 13) for sending an injection command signal to the fuel injection valves 33 so that the fuel is injected from each of the fuel injection valves 33 in an amount corresponding to the designated fuel injection amount Fi.

Figure 16A:
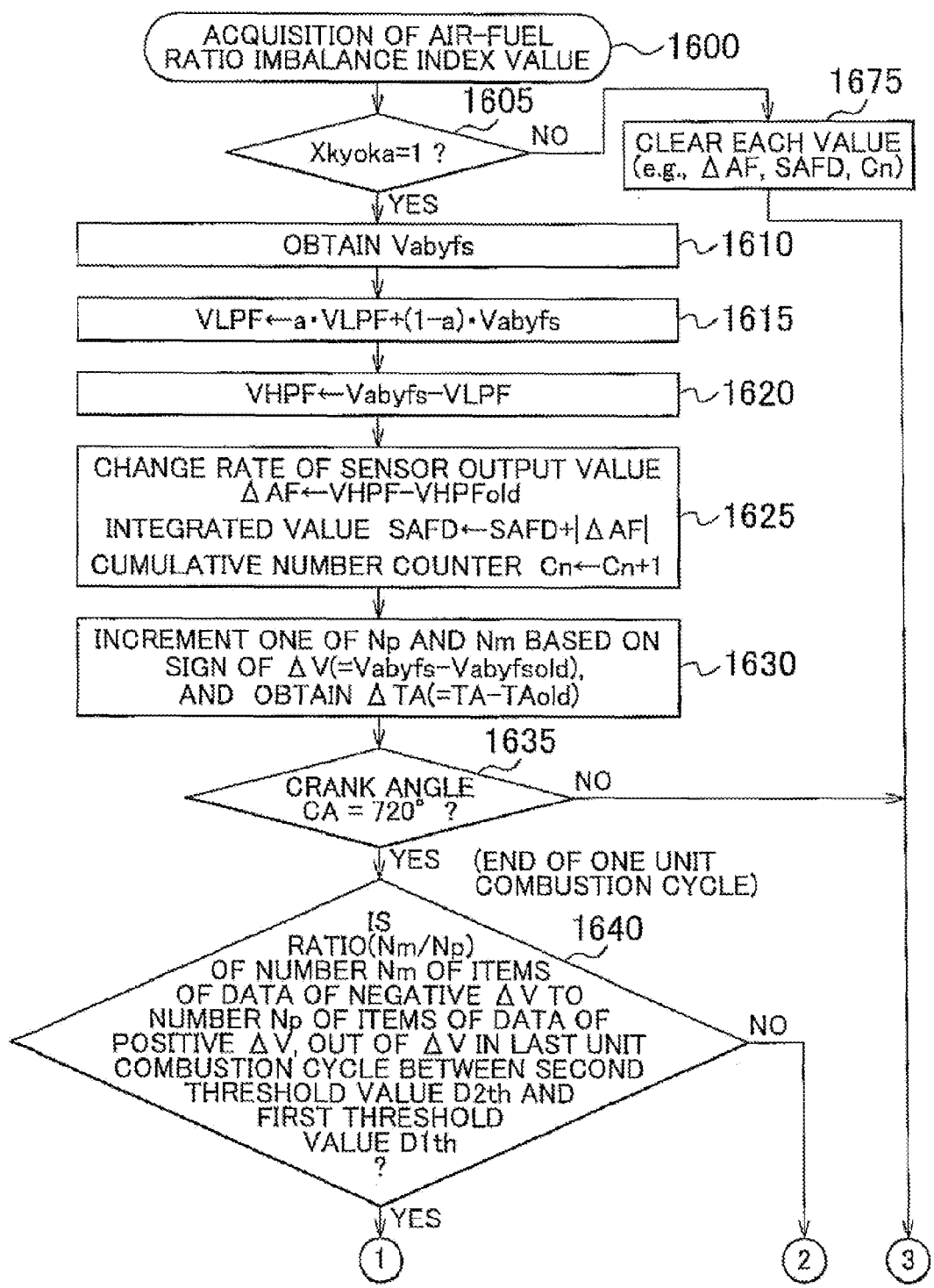

Furthermore, the control device includes a high-pass filtering means (step 1610 through step 1620 of FIG. 16A) for performing a high-pass filtering operation on the output value Vabyfs of the upstream air-fuel ratio sensor 56, so as to obtain a post-high-pass-filtering output value VHPF, and an air-fuel ratio imbalance index value acquiring means (step 1625 of FIG. 16A through step 1665 of FIG. 16. B) for acquiring an air-fuel ratio imbalance index value RIMB which increases as the degree of ununiformity in the air-fuel ratio of an air-fuel mixture supplied to the combustion chamber 21 of each of the plurality of cylinders, among the plurality of cylinders, is larger, and which increases as fluctuations in the post-high-pass-filtering output value VHPF are larger, based on the post-high-pass-filtering output value VHPF.

The time constant of the high-pass filtering operation performed by the high-pass filtering means is set to a value that permits fluctuations in the output value Vabyfs of the upstream air-fuel ratio sensor 56 due to the degree of ununiformity in the air-fuel ratio among the cylinders to pass through the filter, but inhibits fluctuations in the output value Vabyfs of the upstream air-fuel ratio sensor 56 due to fluctuations in the center air-fuel ratio of the engine 10 from passing through the filter. The high-pass filtering operation may be "a high-pass filtering operation by software" as described above, or "an operation using a high-pass filter as a hardware", in place of the high-pass filtering by software.

Figure 4:
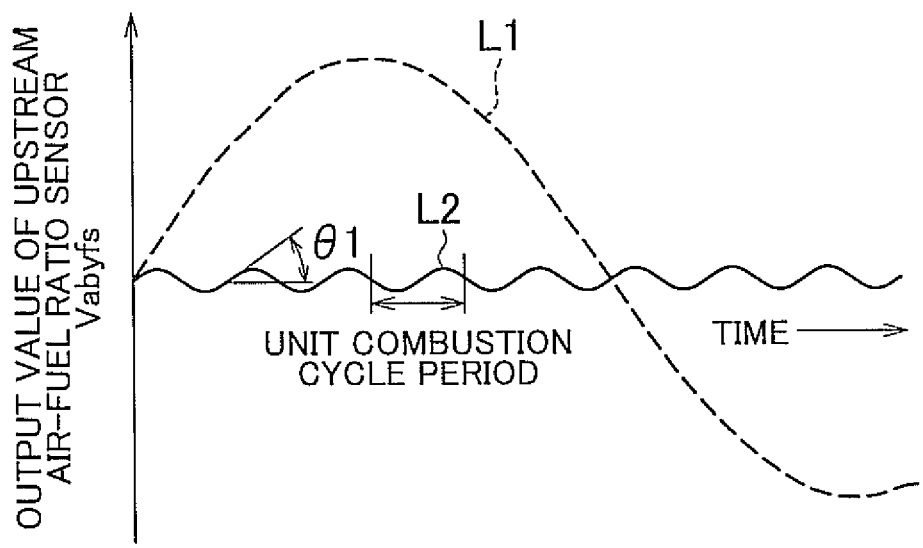
FIG. 4 is a time chart showing the output value of an upstream air-fuel ratio sensor which varies according to the degree of ununiformity in the air-fuel ratio among cylinders, and the output value of the upstream air-fuel ratio sensor which varies according to variations in the center air-fuel ratio of the engine.
Figure 5:
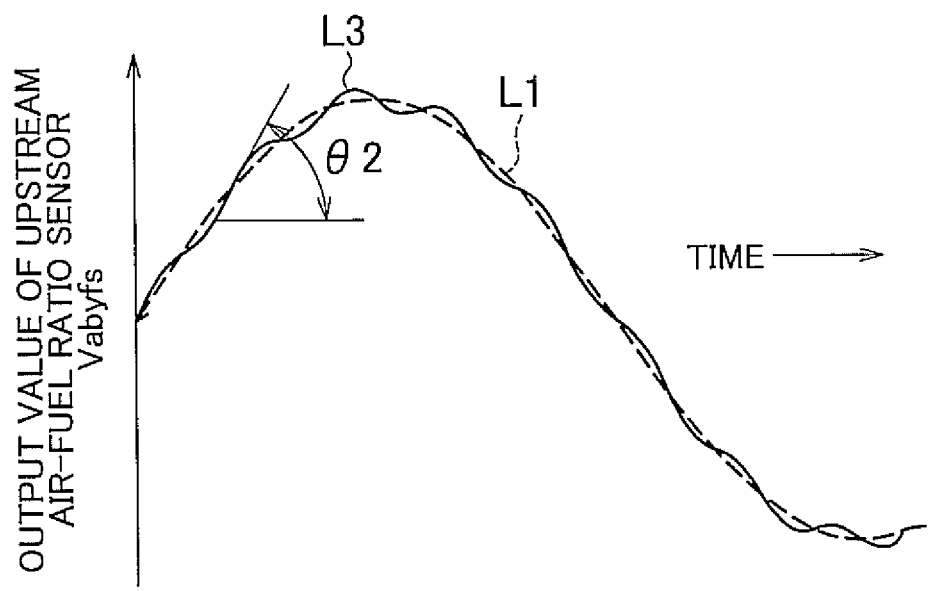
FIG. 5 is a time chart showing the output value of the upstream air-fuel ratio sensor in the case where a component that varies according to the degree of ununiformity in the air-fuel ratio among the cylinders is superimposed on a component that varies according to variations in the center air-fuel ratio of the engine.

The post-high-pass-filtering output value approaches a value (see the solid line L2 of FIG. 4) obtained by removing a fluctuation component (see the broken line L1 of FIG. 4 and FIG. 5) of "the center air-fuel ratio of the engine 10" contained in the output value Vabyfs of the upstream air-fuel ratio sensor 56, from the output value Vabyfs (see the solid line L3 of FIG. 5) of the upstream air-fuel ratio sensor 56. Namely, through the high-pass filtering operation, the output value as indicated by the solid line L3 of FIG. 5 is converted into the output value as indicated by the solid line L2 of FIG. 4. Accordingly, the post-high-pass-filtering output value VHPF varies depending on the degree of ununiformity in the air-fuel ratio among the cylinders, without being influenced by fluctuations in the center air-fuel ratio of the engine 10. As a result, an air-fuel ratio imbalance index value RIMB (imbalance index learned value RIMBg) that accurately represents the degree of ununiformity in the air-fuel ratio among the cylinders can be acquired, based on the post-high-pass-filtering output value VHPF.

In the meantime, if there is ununiformity or imbalances in the air-fuel ratio among the individual cylinders, the true average air-fuel ratio of the engine (accordingly, the average of the true air-fuel ratio of exhaust gas) is controlled to an air-fuel ratio that is leaner (or larger) than "a target air-fuel ratio set to a reference air-fuel ratio that is equal to or around the stoichiometric air-fuel ratio", through the above-described feedback control (main feedback control). The reason is as follows. If the air-fuel ratio of an air-fuel mixture supplied to a certain cylinder becomes richer than the stoichiometric ratio, the amount of unburned substances (HC, CO and H$_2$) emitted from the cylinder rapidly increases, for example, quadratically (see FIG. 2). Therefore, even if the average air-fuel ratio of the engine is equal, a larger amount of hydrogen is discharged when the degree of ununiformity in the air-fuel ratio among the cylinders is large, as compared with the case where the degree of ununiformity in the air-fuel ratio among the cylinders is small. As a result, the large amount of hydrogen causes the output value of the upstream air-fuel ratio sensor to shift to "a richer output value", because preferential diffusion (or selective diffusion) of hydrogen takes place in the diffusion resistance layer (porous layer) of the upstream air-fuel ratio sensor.

The "shift of the air-fuel ratio to a learner (or larger) value due to selective diffusion of hydrogen and main feedback control" as described above will also be simply called "erroneous lean correction". The "erroneous lean correction" also occurs in the case where the air-fuel ratio of the imbalance cylinder is shifted to be leaner than the air-fuel ratio of the non-imbalance cylinders. Furthermore, the amount of shift of the air-fuel ratio to the lean side due to the erroneous lean correction increases as the degree of selective diffusion of hydrogen increases, and therefore increases as the degree of ununiformity in the air-fuel ratio among the cylinders increases.

If the erroneous lean correction occurs, the true air-fuel ratio of the engine may become leaner (larger) than "the window of the three-way catalyst". In this case, the NOx (nitrogen oxides) conversion efficiency of the three-way catalyst may be reduced, and the amount of NOx emissions may be increased.

On the other hand, exhaust gas that has passed through the three-way catalyst reaches a downstream air-fuel ratio sensor located downstream of the three-way catalyst. Hydrogen is converted and removed to some extent at the three-way catalyst. Accordingly, even when the degree of ununiformity in the air-fuel ratio among the cylinders is large, the downstream air-fuel ratio sensor generates an output value that is close to the true average air-fuel ratio of the engine. Thus, if "known sub-feedback control" for making the output value of the downstream air-fuel ratio sensor equal to "a downstream-side target value corresponding to an air-fuel ratio around the stoichiometric air-fuel ratio" is carried out, it is possible to avoid the occurrence of the erroneous lean correction.

However, the sub-feedback amount is often provided with the upper limit and the lower limit. If the sub-feedback amount becomes equal to the upper limit or the lower limit, the air-fuel ratio of the engine cannot be sufficiently controlled even with the sub-feedback amount, and the amount of NOx emissions may be increased. Also, the sub-feedback amount is adapted to change relatively slowly. Accordingly, even when the sub-feedback amount is not provided with the upper limit and the lower limit, or even when the sub-feedback amount does not coincide with the upper limit or lower limit, the amount of NOx emissions may be increased during a period, for example, after starting of the engine, in which period the sub-feedback amount is set to an inappropriate value.

In view of the above situations, the control device of this embodiment further includes a fuel amount increasing means (see FIG. 17, step 1320 of FIG. 13, step 1425 of FIG. 14, etc.) for increasing/correcting the designated fuel injection amount Fi based on the air-fuel ratio imbalance index value RIMB (actually, the imbalance index learned value RIMBg obtained based on the air-fuel ratio imbalance index value RIMB), so that the air-fuel ratio (designated air-fuel ratio (=the amount of intake air drawn into each cylinder/designated fuel injection amount)) determined by the designated fuel injection amount Fi becomes "an air-fuel ratio that is reduced as the air-fuel ratio imbalance index value is larger". In this specification, the "control for increasing the designated fuel injection amount based on the air-fuel ratio imbalance index value (control for shifting the designated air-fuel ratio to a richer value)" as described above is also called "fuel amount increasing control for compensating for erroneous lean correction".

The control device acquires the air-fuel ratio imbalance index value RIMB based on the post-high-pass-filtering output value VHPF. Thus, since the air-fuel ratio imbalance index value RIMB (imbalance index learned value RIMBg) accurately represents the degree of ununiformity in the air-fuel ratio among the cylinders, the fuel amount increasing control for compensating for erroneous lean correction is appropriately carried out by the fuel amount increasing means, according to the degree of ununiformity in the air-fuel ratio among the cylinders. Consequently, an influence of the erroneous lean correction can be reduced, and the fuel is prevented from being excessively increased, resulting in reduction of the amount of the emissions (NOx and unburned substances).

The air-fuel ratio imbalance index value acquiring means included in the control device includes an air-fuel ratio imbalance index value calculating means (see step 1610 of FIG. 16A through step 1665 of FIG. 16B) for obtaining basic index value data (the rate of change ΔAF) that provides basic data used when calculating the air-fuel ratio imbalance index value RIMB, based on the post-high-pass-filtering output value VHPF, each time a given first sampling time t1 elapses, and calculating the air-fuel ratio imbalance index value RIMB using a plurality of items of the basic index value data (the change rates ΔAF). For example, the air-fuel ratio imbalance index value calculating means obtains values corresponding to time differential values of the post-high-pass-filtering output values, as basic index value data, and calculates the average value or maximum value, or the like, of the plurality of time differential values thus obtained, as the air-fuel ratio imbalance index value.

Further, the air-fuel ratio imbalance index value acquiring means included in the control device includes a data discarding means for obtaining differential value correlation data ΔV having a value corresponding to either of "a time differential value d(Vabyfs)/dt of the output value Vabyfs of the upstream air-fuel ratio sensor 56, and a time differential value d(VHPF)/dt of the post-high-pass-filtering output value VHPF" each time a given second sampling time (actually, the first sampling time) elapses, in a certain unit combustion cycle period, (step 1630 of FIG. 16A), and discarding the basic index value data (the change rates ΔAF) obtained in the unit combustion cycle period (namely, inhibiting the basic index value data from being used for calculation of the air-fuel ratio imbalance index value RIMB), when the ratio (Nm/Np) of the number Nm of items of data having negative signals, out of the obtained differential value correlation data ΔV, to the number Np of items of data having positive signs, out of the obtained differential value correlation data ΔV, is "equal to or larger than a first threshold value, or equal to or smaller than a second threshold value that is smaller than the first threshold value" (step 1640 of FIG. 16A). The second sampling time may be equal to or different from the first sampling time.

In this case, the ratio (Nm/Np) may be obtained, and it may be determined whether the ratio (Nm/Np) is "equal to or larger than the first threshold value, or equal to or smaller than the second threshold value that is smaller than the first threshold value". Alternatively, it may be determined, using a value(s) other than the ratio (Nm/Np), whether the ratio (Nm/Np) is "equal to or larger than the first threshold value, or equal to or smaller than the second threshold value that is smaller than the first threshold value". For example, the determination may be made using the ratio (Np/Nm), ratio {Nm/(Np+Nm)}, or the ratio {Np/(Np+Nm)}, for example, and may also be made based on a value correlated with a difference (Nm−Np).

While the center air-fuel ratio of the engine is decreasing, the differential value correlation data having a value corresponding to the time differential value of the output value of the upstream air-fuel ratio sensor is less likely to be a positive value, and is highly likely to be a negative value. Accordingly, in a certain unit combustion cycle period, an imbalance arises "between the number Np of items of data having positive signs and the number Nm of items of data having negative signs" out of the differential value correlation data obtained in that period, and the above-indicated ratio (Nm/Np) becomes larger than the first threshold value. In this case, the data discarding means discards the basic index value data obtained in the above-indicated unit combustion cycle period, so that the basic index value data is not used for calculation of the air-fuel ratio imbalance index value. Thus, it is possible to acquire an air-fuel ratio imbalance index value that represents the degree of ununiformity in the air-fuel ratio among the cylinders with further improved accuracy.

Similarly, while the center air-fuel ratio of the engine is increasing, the differential value correlation data having a value corresponding to the time differential value of the output value of the upstream air-fuel ratio sensor is highly likely to be a positive value, and is less likely to be a negative value. Accordingly, in a certain unit combustion cycle period, an imbalance arises "between the number Np of items of data having positive signs and the number Nm of items of data having negative signs" out of the differential value correlation data obtained in that period, and the above-indicated ratio (Nm/Np) becomes smaller than the second threshold value. In this case, the data discarding means discards the basic index value data obtained in the above-indicated unit combustion cycle period, so that the basic index value data is not used for calculation of the air-fuel ratio imbalance index value. Thus, it is possible to acquire an air-fuel ratio imbalance index value that represents the degree of ununiformity in the air-fuel ratio among the cylinders with further improved accuracy.

In addition, while the center air-fuel ratio of the engine is varying, an influence of fluctuations in the center air-fuel ratio of the engine may not be completely removed from the output value of the upstream air-fuel ratio sensor, even through the above-described high-pass filtering operation.

In this case, while the center air-fuel ratio of the engine is decreasing, the differential value correlation data having a value corresponding to the time differential value of the post-high-pass-filtering output value is less likely to be a positive value, and is highly likely to be a negative value. Accordingly, in a certain unit combustion cycle period, an imbalance arises "between the number Np of items of data having positive signs and the number Nm of items of data having negative signs" out of the differential value correlation data obtained in that period, and the above-indicated ratio (Nm/Np) becomes larger than the first threshold value. In this case, the data discarding means discards the basic index value data obtained in the above-indicated unit combustion cycle period, so that the basic index value data is not used for calculation of the air-fuel ratio imbalance index value. Thus, it is possible to acquire an air-fuel ratio imbalance index value that represents the degree of ununiformity in the air-fuel ratio among the cylinders with further improved accuracy.

Similarly, while the center air-fuel ratio of the engine is increasing, the differential value correlation data having a value corresponding to the time differential value of the post-high-pass-filtering output value is highly likely to be a positive value, and is less likely to be a negative value. Accordingly, in a certain unit combustion cycle period, an imbalance arises "between the number Np of items of data having positive signs and the number Nm of items of data having negative signs" out of the differential value correlation data obtained in that period, and the above-indicated ratio (Nm/Np) becomes smaller than the second threshold value. In this case, the data discarding means discards the basic index value data obtained in the above-indicated unit combustion cycle period, so that the basic index value data is not used for calculation of the air-fuel ratio imbalance index value. Thus, it is possible to acquire an air-fuel ratio imbalance index value that represents the degree of ununiformity in the air-fuel ratio among the cylinders with further improved accuracy.

Alternatively, the data discarding means may be configured to discard the basic index value data obtained in the unit combustion cycle period (inhibits the basic index value data from being used for calculation of the air-fuel ratio imbalance index value), when the output value of the upstream air-fuel ratio sensor or the post-high-pass-filtering output value keeps increasing or keeps decreasing over the unit combustion cycle period.

When the output value of the upstream air-fuel ratio sensor keeps increasing or keeps decreasing, the center air-fuel ratio of the engine is highly likely to be largely fluctuating; therefore, it is preferable not to use the basic index value data obtained in such cases, for calculation of the air-fuel ratio imbalance index value.

When the post-high-pass-filtering output value keeps increasing or keeps decreasing, the post-high-pass-filtering output value is more or less influenced by the center air-fuel ratio of the engine, and the center air-fuel ratio of the engine is highly likely to be largely fluctuating; therefore, it is preferable not to use the basic index value data obtained in such cases, for calculation of the air-fuel ratio imbalance index value.

With the above-described data discarding means thus provided, the air-fuel ratio imbalance index value RIMB is not calculated based on the post-high-pass-filtering output value VHPF obtained when the center air-fuel ratio of the engine 10 is largely varying or fluctuating. It is thus possible to acquire an air-fuel ratio imbalance index value RIMB that represents the degree of ununiformity in the air-fuel ratio among the cylinders with improved accuracy.

Furthermore, the air-fuel ratio imbalance index value acquiring means included in the control device further includes a data discarding means (step 1630 of FIG. 16A and step 1645 of FIG. 16B) for discarding the basic index value data (the rates of change ΔAF) obtained in a certain unit combustion cycle period, so that the basic index value data is not used for calculation of the air-fuel ratio imbalance index value RIMB, when the magnitude of a value dG corresponding to a time differential value of "an intake air amount correlation parameter that increases as the intake air amount Ga increases" becomes equal to or larger than a third threshold value D3th during the unit combustion cycle period.

In this case, the intake air amount correlation parameter may be the throttle opening of the engine, or may be the intake air amount itself, the accelerator pedal operation amount, the load (load factor) of the engine, or the like.

When the intake air amount Ga increases (namely, when the vehicle is in an accelerating condition), or when the intake air amount Ga decreases (namely, when the vehicle is in a decelerating condition), the center air-fuel ratio of the engine 10 is likely to fluctuate or vary, and therefore, it is preferable not to use the basic index value data (the rates of change ΔAF) obtained in this case for calculation of the air-fuel ratio imbalance index value RIMB. Thus, the provision of the data discarding means as described above makes it possible to acquire an air-fuel ratio imbalance index value RIMB that represents the degree of ununiformity in the air-fuel ratio among the cylinders with further improved accuracy.

As is understood from the above description, the control device of this embodiment includes a component extracting means (see step 1610 through step 1620 of FIG. 16A, step 1640 of FIG. 16A and step 1645 of FIG. 16B) for extracting "a component that varies in a cycle of one unit combustion cycle period (a component that varies depending on the degree of ununiformity in the air-fuel ratio among the cylinders)" from the output value Vabyfs of the upstream air-fuel ratio sensor 56, an air-fuel ratio imbalance index value acquiring means (step 1625 and step 1635 of FIG. 16A, step 1650 through step 1665 of FIG. 16B) for acquiring "an air-fuel ratio imbalance index value RIMB which increases as fluctuations in the extracted component are larger" and which increases as the degree of ununiformity in the air-fuel ratio among the cylinders is larger, based on the extracted component, and a fuel amount increasing means for carrying out the above-mentioned fuel amount increasing control for compensating for erroneous lean correction.

With the above arrangement, the air-fuel ratio imbalance index value represents the degree of ununiformity in the air-fuel ratio among the cylinders with improved accuracy, and therefore, the fuel amount increasing control for compensating for erroneous lean correction is appropriately performed depending on the degree of ununiformity in the air-fuel ratio among the cylinders. Consequently, the influence of the erroneous lean correction can be reduced, and the fuel is prevented from being excessively increased, resulting in reduction of the amount of the emissions (NOx and unburned substances).

It is to be understood that the invention is not limited to the illustrated embodiment, but various modified examples within the range of the invention may be employed. For example, the imbalance index value acquiring means for acquiring an air-fuel ratio imbalance index value RIMB may acquire "an air-fuel ratio fluctuation index amount AFD that increases as fluctuations in the post-high-pass-filtering output value VHPF are larger" as the air-fuel ratio imbalance index value RIMB, by a method as will be described below.

As described above, the air-fuel ratio imbalance index value acquiring means may be configured to obtain a differential value d(VHPF)/dt (rate of change ΔAF) of the post-high-pass-filtering output value VHPF with respect to time, and obtain a value correlated with the obtained differential value d(VHPF)/dt, as an air-fuel ratio imbalance index value RIMB.

One example of the value correlated with the obtained differential value d(VHPF)/dt is an average value of absolute values of a plurality of differential values d(VHPF)/ds obtained over a period that is equal to or two or more (a natural number) times as long as a unit combustion cycle, as described above. Another example of the value correlated with the obtained differential value d(VHPF)/ds is a value obtained by averaging the maximum value of absolute values of a plurality of differential values d(VHPF)/dt obtained in a unit combustion cycle, with respect a plurality of unit combustion cycles.

A further example of the value correlated with the obtained differential value d(VHPF)/dt may be obtained as follows. In a unit combustion cycle period, an absolute value of a differential value d(VHPF)/dt having a positive value is obtained each time a given sampling time elapses, and an average value ΔAFPL of the thus obtained absolute values is obtained. In the unit combustion cycle period, an absolute value of a differential value d(VHPF)/dt having a negative value is obtained each time a given sampling time elapses, and an average value ΔAFMN of these absolute values is obtained. In one unit combustion cycle period, the larger one of the average value ΔAFPL and the average value ΔAFMN is used as the rate of change ΔAF in the unit combustion cycle period. An average value of the change rates ΔAF obtained in the manner as described above in respective unit combustion cycle periods is used as an air-fuel ratio imbalance index value RIMB.

The air-fuel ratio imbalance index value acquiring means may be configured to obtain a differential value d(abyfsF)/dt of the post-filtering air-fuel ratio abyfsF obtained by applying the post-high-pass-filtering output value VHPF to the table Mapabyfs shown in FIG. 10, with respect to time, and acquire a value correlated with the thus obtained differential value d(abyfsF)/dt, as an air-fuel ratio imbalance index value RIMB.

One example of the value correlated with the obtained differential value d(abyfsF)/dt is an average value of absolute values of a plurality of differential values d(abyfsF)/dt obtained over a period that is equal to or two or more (a natural number) times as long as a unit combustion cycle. Another example of the value correlated with the obtained differential value d(abyfsF)/ds is a value obtained by averaging the maximum value of absolute values of a plurality of differential values d(abyfsF)/dt obtained in a unit combustion cycle, with respect a plurality of unit combustion cycles.

The air-fuel ratio imbalance index value acquiring means may be configured to obtain a second-order differential value $d^2(VHPF)/dt^2$ of the post-high-pass-filtering output value VHPF with respect to time, and acquire a value correlated with the obtained second-order differential value $d^2(VHPF)/dt^2$, as an air-fuel ratio imbalance index value RIMB. The second-order differential value $d^2(VHPF)dt^2$ is relatively small as indicated by the broken line C5 in FIG. 3D when differences in the air-fuel ratio among the individual cylinders are small, and is relatively large as indicated by the solid line C6 in FIG. 3D when differences in the air-fuel ratio among the cylinders are large. The second differential value $d^2(VHPF)/dt^2$, which is further less likely to be influenced by fluctuations in the center air-fuel ratio of the engine 10, is favorably used as basic index value data for calculating the air-fuel ratio imbalance index value RIMB.

In this connection, the second-order differential value $d^2(VHPF)/dt^2$ can be obtained by obtaining a differential value d(VHPF)/dt at intervals of a given sampling time, by subtracting the output value VHPF detected the given sampling time prior to the present time, from the output value VHPF detected at the present time, and subtracting a differential value d(VHPF)/dt obtained the given sampling time prior to the present time, from the newly obtained differential value d(VHPF)/dt.

One example of the value correlated with the obtained second-order differential value $d^2(VHPF)/dt^2$ is an average value of absolute values of a plurality of second-order differential values $d^2(VHPF)/dt^2$ obtained over a period that is equal to or two or more (a natural number) times as long as a unit combustion cycle. Another example of the value correlated with the obtained second-order differential value $d^2(VHPF)/dt^2$ is a value obtained by averaging the maximum value of absolute values of a plurality of second-order differential values $d^2(VHPF)/dt^2$ obtained in a unit combustion cycle, with respect to a plurality of unit combustion cycles.

The air-fuel ratio imbalance index value acquiring means may be configured to obtain a second-order differential value $d^2(abyfsF)/dt^2$ of the post-filtering air-fuel ratio abyfsF obtained by applying the post-high-pass-filtering output value VHPF to the table Mapabyfs as shown in FIG. 10, with respect to time, and acquire a value correlated with the obtained second-order differential value $d^2(abyfsF)/dt^2$, as an air-fuel ratio imbalance index value RIMB. Since the output value Vabyfs and the sensed air-fuel ratio abyfs are in a substantially proportional relationship (see FIG. 10), the second-order differential value $d^2(abyfsF)/dt^2$ shows substantially the same tendency or characteristics as the second-order differential value $d^2(Vabyfs)/dt^2$ of the output value Vabyfs.

One example of the value correlated with the obtained second-order differential value $d^2(abyfsF)/dt^2$ is an average value of absolute values of a plurality of second-order differential values $d^2(abyfsF)/dt^2$ obtained over a period that is equal to or two or more (a natural number) times as long as a unit combustion cycle. Another example of the value correlated with the obtained second-order differential value $d^2(abyfsF)/dt^2$ is a value obtained by averaging the maximum value of absolute values of a plurality of second-order differential values $d^2(abyfsF)/dt^2$ obtained in a unit combustion cycle, with respect to a plurality of unit combustion cycles.

The air-fuel ratio imbalance index value acquiring means may be configured to acquire a value correlated with a difference ΔX between the maximum value and the minimum value of the post-high-pass-filtering output value VHPF, over a predetermined period (for example, a period that is equal to or two or more (a natural number) times as long as one unit combustion cycle period), or a value correlated with a difference ΔY between the maximum value and the minimum value of the post-filtering air-fuel ratio abyfsF obtained by applying the post-high-pass-filtering output value VHPF to the table Mapabyfs shown in FIG. 10, over the predetermined period, as an air-fuel ratio imbalance index value RIMB. As is apparent from the solid line C2 and broken line C1 indicated in FIG. 3B, the difference ΔX (the absolute value of ΔX) increases as differences in the air-fuel ratio among the individual cylinders are larger. Accordingly, the difference ΔX (the absolute value of ΔX) and the different ΔY (the absolute value of ΔY) increase with increase of the differences in the air-fuel ratio among the cylinders. One example of the value correlated with the difference ΔX (or difference ΔY) is an average value of absolute values of a plurality of differences ΔX (or ΔY) obtained over a period that is equal to or two or more (a natural number) times as long as one unit combustion cycle.

The air-fuel ratio imbalance index value acquiring means may be configured to acquire a value correlated with a trace length of the post-high-pass-filtering output value VHPF over a predetermined period, or a value correlated with a trace length of the post-filtering air-fuel ratio abyfsF obtained by applying the post-high-pass-filtering output value VHPF to the table Mapabyfs shown in FIG. 10, over the predetermined period, as an air-fuel ratio imbalance index value RIMB. As is apparent from FIG. 3B, these trace lengths become larger as differences in the air-fuel ratio among the individual cylinders are larger. One example of the value correlated with the trace length is an average value of absolute values of a plurality of trace lengths obtained over a period that is equal to or two or more (a natural number) times as long as one unit combustion cycle.

For example, the trace length of the post-high-pass-filtering output value VHPF may be determined by obtaining an output value VHPF each time a given first sampling time t1 elapses, and integrating an absolute value of a difference between the output value VHPF, and the output value VHPF obtained the first sampling time t1 prior to the present time.

In the meantime, each of the above-described control devices may be applied to a V-type engine. In this case, the V-type engine has a right-bank upstream catalyst located downstream of an exhaust gathering portion of two or more cylinders that belong to the right bank of the engine. Further, the V-type engine has a left-bank upstream catalyst located downstream of an exhaust gathering portion of two or more cylinders that belong to the left bank of the engine.

In addition, the V-type engine may include upstream air-fuel ratio sensor and downstream air-fuel ratio sensor for the right bank, which are respectively located upstream and downstream of the right-bank upstream catalyst, and upstream air-fuel ratio sensor and downstream air-fuel ratio sensor for the left bank, which are respectively located upstream and downstream of the left-bank upstream catalyst. Like the above-described upstream air-fuel ratio sensor 56, each upstream air-fuel ratio sensor is disposed between the exhaust gathering portion of each bank and the upstream catalyst of each bank. In this case, main feedback control and sub-feedback control for the right bank are executed, and main feedback control and sub-feedback control for the left bank are executed, independently of those for the right bank.

Further, in this case, the control device obtains "an imbalance index learned value RIMBg for the right bank", based on the post-high-pass-filtering output value of the output value of the upstream air-fuel ratio sensor for the right bank, and corrects the target air-fuel ratio abyfr of main feedback control for the cylinders belonging to the right bank, using the obtained imbalance index learned value RIMBg. Similarly, the control device obtains "an imbalance index learned value RIMBg for the left bank", based on the post-high-pass-filtering output value of the output value of the upstream air-fuel ratio sensor for the left bank, and corrects the target air-fuel ratio abyfr of main feedback control for the cylinders belonging to the left bank, using the obtained imbalance index learned value RIMBg.

Further, the control device may perform main feedback control, by using "an oxygen concentration sensor of the same electromotive force type as the downstream air-fuel ratio sensor 57 (known concentration cell type oxygen concentration sensor using a solid electrolyte, such as stabilized zirconia), as the upstream air-fuel ratio sensor 56.

Figure 18:
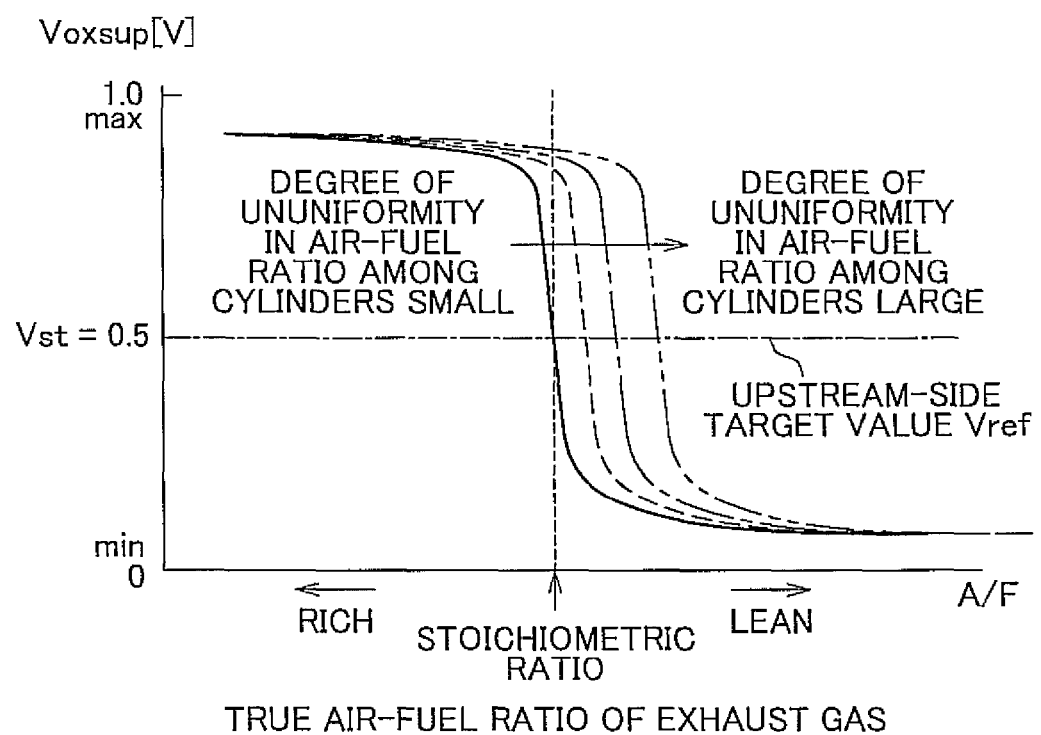
FIG. 18 is a graph relating to a modified example of the invention, and indicating the relationship between the air-fuel ratio of exhaust gas flowing into a three-way catalyst, and an output value of an air-fuel ratio sensor in the form of "an electromotive force type oxygen concentration sensor" located upstream of the three-way catalyst.

As described above, the electromotive force type oxygen concentration sensor also includes a porous layer. Accordingly, if the electromotive force type oxygen concentration sensor is placed "between the exhaust gathering portion HK and the upstream catalyst 43", the output value (denoted as Voxsup so as to be distinguished from the output value Voxs of the downstream air-fuel ratio sensor 57) of the electromotive force type oxygen concentration sensor is influenced by selective diffusion of hydrogen. Therefore, the output value Voxsup responsive to the true air-fuel ratio of exhaust gas flowing into the upstream catalyst 43 varies depending on the degree of ununiformity of the air-fuel ratio among the individual cylinders, as shown in FIG. 18.

Generally, when the electromotive force type oxygen concentration sensor is used as "the upstream air-fuel ratio sensor for main feedback control", feedback control of the air-fuel ratio is performed so that the output value Voxup becomes equal to an upstream-side target value Vref that is set to "a value Vst corresponding to the stoichiometric air-fuel ratio as a target air-fuel ratio". Accordingly, as the degree of ununiformity in the air-fuel ratio among the cylinders increases, the average of the true air-fuel ratio of exhaust gas obtained as a result of the main feedback control shifts to a leaner air-fuel ratio than the stoichiometric ratio. Namely, erroneous lean correction takes place.

Therefore, when the electromotive force type oxygen concentration sensor is used as "the upstream air-fuel ratio sensor for main feedback control", too, it is preferable to obtain a post-high-pass-filtering output value by performing a high-pass filtering operation on the output value Voxsup of the sensor, acquire an air-fuel ratio imbalance index value RIMB based on the post-high-pass-filtering output value, and execute fuel amount increasing control for compensating up for erroneous lean correction, based on the air-fuel ratio imbalance index value RIMB. In this case, the fuel amount increasing control for compensating for erroneous lean correction is implemented by correcting "the upstream-side target value Vref" to a value (larger than value Vst) corresponding to a richer air-fuel ratio, based on the air-fuel ratio imbalance index value RIMB. In this manner, an influence of erroneous lean correction can be suppressed or reduced, and the amount of fuel is prevented from being excessively increased.

In the control device as described above, the sub-feedback amount KSFB is used for directly correcting the target air-fuel ratio abyfr. Instead of using the sub-feedback amount KSFB, "a sub-feedback amount Vafsfb calculated similarly to the sub-feedback amount KSFB" may be added to the output value Vabyfs of the upstream air-fuel ratio sensor 56, as indicated in Equation (21) below, so as to provide an output value Vabyfc for use in feedback control.

$$Vabyfc = Vabyfs + Vafsfb \quad (21)$$

Then, as indicated in Equation (22) below, the output value Vabyfc for feedback control is applied to the table Mapabyfs as shown in FIG. 10, so as to obtain an air-fuel ratio abyfsc for use in feedback control, and a main feedback amount DFi may be determined so that the air-fuel ratio abyfsc for feedback control becomes equal to "the target air-fuel ratio abyfr (=stoich−kacc−daf) corrected based on the air-fuel ratio imbalance index value RIMB (the imbalance index learned value RIMBg)". Namely, in this embodiment, the target air-fuel ratio abyfr is not directly corrected by the sub-feedback amount, but the target air-fuel ratio abyfr is substantially corrected by correcting the output value Vabyfs of the upstream air-fuel ratio sensor 56 with the sub-feedback amount.

$$abyfsc = Mapabyfs(Vabyfc) \quad (22)$$

In addition, both step 1640 of FIG. 16A and step 1645 of FIG. 16B as indicated above, or either of these steps, may be eliminated. Also, one or more of the above-described data discarding methods (data discarding means) may be combined as appropriate and used.

What is claimed is:
1. A fuel injection amount control device of a multi-cylinder internal combustion engine, comprising:
a three-way catalyst mounted at a position downstream of an exhaust gathering portion of an exhaust passage of the multi-cylinder internal combustion engine into which exhaust gases emitted from a plurality of cylinders of the multi-cylinder internal combustion engine are collected;

an upstream air-fuel ratio sensor provided at a location between the exhaust gathering portion of the exhaust passage and the three-way catalyst;

a plurality of fuel injection valves each of which is arranged to inject fuel to be contained in an air-fuel mixture supplied to a combustion chamber of each of said plurality of cylinders;

a designated fuel injection amount determining section that determines a designated fuel injection amount as a command value indicative of an amount of fuel injected from each of said plurality of fuel injection valves, by feedback-correcting the amount of fuel injected from said each fuel injection valve based on an output value of the upstream air-fuel ratio sensor, so that an air-fuel ratio of exhaust gas flowing into the three-way catalyst coincides with a target air-fuel ratio;

an injection command signal sending section that sends an injection command signal to said plurality of fuel injection valves so that the fuel is injected from said each fuel injection valve in an amount corresponding to the designated fuel injection amount;

a high-pass filtering section that performs a high-pass filtering operation on the output value of the upstream air-fuel ratio sensor, so as to obtain a post-high-pass-filtering output value; and an air-fuel ratio imbalance index value acquiring section that acquires an air-fuel ratio imbalance index value which increases as a degree of ununiformity in the air-fuel ratio of the air-fuel mixture supplied to the combustion chamber of each of said plurality of cylinders, among said plurality of cylinders, is larger, and which increases as fluctuations in the post-high-pass-filtering output value are larger, based on the post-high-pass-filtering output value, the air-fuel ratio imbalance index value acquiring section includes an air-fuel ratio imbalance index value calculating section and a data discarding section, the air-fuel ration imbalance index value acquiring section obtains basic index value data that provides basic data used when calculating the air-fuel ratio imbalance index value, based on the post-high-pass-filtering output value, each time a given first sampling time elapses, and the air-fuel ratio imbalance index value calculating section calculates the air-fuel ratio imbalance index value, using a plurality of items of the basic index value data, the data discarding section that obtains differential value correlation data having a value corresponding to one of a time differential value of the output value of the upstream air-fuel ratio sensor and a time differential value of the post-high-pass-filtering output value each time a given second sampling time elapses, in a unit combustion cycle period as a period corresponding to a crank angle required for all of the cylinders from which the exhaust gases that reach the upstream air-fuel ratio sensor are emitted to complete one combustion cycle of each cylinder, and the data discarding section discards the basic index value data obtained in the unit combustion cycle period so as to inhibit the basic index data value from being used for calculation of the air-fuel ratio imbalance index value, when a ratio of the number of items Nm of data having negative signs, out of the obtained differential value correlation data, to the number of items Np of data having positive signs, out of the obtained differential value correlation data, is equal to or larger than a first threshold value, or is equal to or smaller than a second threshold value that is smaller than the first threshold value.

* * * * *